(12) United States Patent
Miller et al.

(10) Patent No.: US 11,846,121 B2
(45) Date of Patent: Dec. 19, 2023

(54) DEVICE AND METHODS FOR PROVIDING A LOCK FOR PREVENTING UNWANTED ACCESS TO A LOCKED ENCLOSURE

(71) Applicant: Lock II, LLC, Nicholasville, KY (US)

(72) Inventors: J. Clayton Miller, Nicholasville, KY (US); Michael P. Harvey, Laguna Niguel, CA (US)

(73) Assignee: LOCK II, LLC, Nicholasville, KY (US)

( * ) Notice: Subject to any disclaimer, the term of this patent is extended or adjusted under 35 U.S.C. 154(b) by 616 days.

(21) Appl. No.: 16/617,438

(22) PCT Filed: May 31, 2018

(86) PCT No.: PCT/US2018/035309
§ 371 (c)(1),
(2) Date: Nov. 26, 2019

(87) PCT Pub. No.: WO2018/222817
PCT Pub. Date: Dec. 6, 2018

(65) Prior Publication Data
US 2020/0141157 A1 May 7, 2020

Related U.S. Application Data

(60) Provisional application No. 62/514,135, filed on Jun. 2, 2017.

(51) Int. Cl.
*E05B 47/06* (2006.01)
*H02S 10/10* (2014.01)
(Continued)

(52) U.S. Cl.
CPC ...... *E05B 47/0603* (2013.01); *E05B 47/0012* (2013.01); *H02K 7/116* (2013.01);
(Continued)

(58) Field of Classification Search
CPC ............. E05B 47/0603; E05B 47/0012; E05B 47/0673; E05B 47/026; E05B 2047/0058;
(Continued)

(56) References Cited

U.S. PATENT DOCUMENTS 3,733,861 A   5/1973 Lester
4,148,092 A   4/1979 Martin
(Continued)

FOREIGN PATENT DOCUMENTS

CN   101638959 A   2/2010
CN   101666297 A   3/2010
(Continued)

OTHER PUBLICATIONS

Japanese Patent Office, Japanese Office Action in related Japanese Patent Application No. 2019-566265 dated Nov. 21, 2022; 3 pages.
(Continued)

*Primary Examiner* — Emily P Pham
(74) *Attorney, Agent, or Firm* — Rooney IP, LLC

(57) ABSTRACT

A device for preventing unwanted opening of a locked enclosure includes a lock bolt moveable between a locked position and an unlocked position. A lever arm is movable between disengaged and engaged positions and moves the lock bolt between the locked and unlocked positions. A rotary element is engageable with the lever arm in the engageable position. The rotation of the rotary element when the rotary element is engaged with the lever arm moves the lock bolt between the locked and unlocked positions. A pin normally blocks the lever arm from moving from the disengaged position to the engageable position. A rotatable output gear moves a rack gear and the pin to unblock the lever arm and thereby allowing the lever arm to engage with
(Continued)

the rotary element to allow a user to rotate the rotary element to move the lock bolt between the locked and unlocked positions.

14 Claims, 15 Drawing Sheets

(51) Int. Cl.
- *H02S 10/20* (2014.01)
- *E05B 47/00* (2006.01)
- *H02K 7/116* (2006.01)
- *H02K 7/18* (2006.01)
- *H02K 11/00* (2016.01)
- *E05B 65/00* (2006.01)
- *G07C 9/00* (2020.01)
- *G07C 9/20* (2020.01)

(52) U.S. Cl.
CPC ....... *H02K 7/1853* (2013.01); *H02K 11/0094* (2013.01); *H02S 10/10* (2014.12); *H02S 10/20* (2014.12); *E05B 65/0075* (2013.01); *E05B 2047/0058* (2013.01); *E05B 2047/0062* (2013.01); *E05B 2047/0064* (2013.01); *E05B 2047/0097* (2013.01); *G07C 9/215* (2020.01); *G07C 2009/0065* (2013.01); *G07C 2009/00484* (2013.01); *G07C 2009/00634* (2013.01); *Y02E 70/30* (2013.01)

(58) Field of Classification Search
CPC ..... E05B 2047/0062; E05B 2047/0064; E05B 2047/0065; E05B 2047/0097; E05B 17/226; E05B 49/00; E05B 65/0075; G07C 9/215; G07C 9/0069; G07C 2009/00484; G07C 2009/00634; G07C 2009/0064; G07C 2009/0065; H02K 7/116; H02K 7/1853; H02K 11/0094; H02S 10/10; H02S 10/20; Y02E 10/50; Y02E 70/30

See application file for complete search history.

(56) References Cited

U.S. PATENT DOCUMENTS

| | | |
|---|---|---|
| 4,433,355 A | 2/1984 | Chew et al. |
| 4,570,466 A | 2/1986 | Matthews |
| 4,766,746 A | 8/1988 | Henderson et al. |
| 4,833,465 A | 5/1989 | Abend et al. |
| 4,838,052 A | 6/1989 | Williams et al. |
| 4,899,562 A | 2/1990 | Gartner et al. |
| 4,901,545 A | 2/1990 | Bacon et al. |
| 4,956,984 A | 9/1990 | Chi-Cheng |
| 5,021,776 A | 6/1991 | Anderson et al. |
| 5,164,718 A | 11/1992 | Cedergren |
| 5,265,452 A | 11/1993 | Dawson et al. |
| 5,280,518 A | 1/1994 | Danler et al. |
| 5,487,290 A | 1/1996 | Miller et al. |
| 5,553,472 A | 9/1996 | Jasper |
| 5,605,066 A | 2/1997 | Hurskainen |
| 5,640,862 A | 6/1997 | Remenicky |
| 5,709,114 A | 1/1998 | Dawson et al. |
| 5,841,361 A | 11/1998 | Hoffman |
| 5,870,914 A | 2/1999 | Dawson |
| 5,873,276 A | 2/1999 | Dawson et al. |
| 5,881,589 A | 3/1999 | Clark et al. |
| 5,894,277 A | 4/1999 | Keskin et al. |
| 5,896,026 A | 4/1999 | Higgins |
| 5,973,624 A | 10/1999 | Miller et al. |
| 6,016,677 A | 1/2000 | Clark |
| 6,047,575 A | 4/2000 | Larson et al. |
| 6,378,344 B1 | 4/2002 | Gartner |
| 6,401,501 B1 | 6/2002 | Kajuch et al. |
| 6,494,067 B1 | 12/2002 | Jasper |
| 6,655,180 B2 | 12/2003 | Gokcebay et al. |
| 6,822,553 B1 | 11/2004 | Henderson et al. |
| 6,898,952 B1 | 5/2005 | Lin |
| 6,989,732 B2 | 1/2006 | Fisher |
| 7,009,489 B2 | 3/2006 | Fisher |
| 7,040,125 B2 | 5/2006 | Ciezki et al. |
| 7,193,503 B2 | 3/2007 | Fisher |
| 7,236,085 B1 | 6/2007 | Aronson et al. |
| 7,336,150 B2 | 2/2008 | Gokcebay et al. |
| 7,456,725 B2 | 11/2008 | Denison et al. |
| 7,482,907 B2 | 1/2009 | Denison et al. |
| 7,683,758 B2 | 3/2010 | Denison et al. |
| 7,741,952 B2 | 6/2010 | Denison et al. |
| 7,768,378 B2 | 8/2010 | Hill et al. |
| 7,903,846 B2 | 3/2011 | Fisher |
| 7,999,656 B2 | 8/2011 | Fisher |
| 8,079,240 B2 | 12/2011 | Brown et al. |
| 8,141,400 B2 | 3/2012 | Sorensen et al. |
| 8,225,629 B2 | 7/2012 | Zuraski et al. |
| 8,228,030 B2 | 7/2012 | Pukari et al. |
| 8,453,481 B2 | 6/2013 | Meekma |
| 8,456,277 B2 | 6/2013 | Gillert et al. |
| 8,581,690 B2 | 11/2013 | Lappalainen et al. |
| 8,587,405 B2 | 11/2013 | Denison et al. |
| 8,850,858 B2 | 10/2014 | Nave |
| 8,866,439 B2 | 10/2014 | Pukari et al. |
| 8,902,040 B2 | 12/2014 | Greisen et al. |
| 8,922,333 B1 | 12/2014 | Kirkjan |
| 8,981,899 B2 | 3/2015 | Pukari et al. |
| 9,019,067 B2 | 4/2015 | Bryla et al. |
| 9,024,759 B2 | 5/2015 | Uyeda et al. |
| 9,059,713 B2 | 6/2015 | Jonely et al. |
| 9,085,919 B2 | 7/2015 | Bacon |
| 9,109,379 B1 | 8/2015 | Ranchod |
| 9,129,457 B2 | 9/2015 | Sumcad et al. |
| 9,140,035 B2 | 9/2015 | McKibben et al. |
| 9,574,375 B2 | 2/2017 | Henderson |
| 9,652,907 B2 | 5/2017 | Geerlings |
| 2002/0121784 A1 | 9/2002 | Chevalier |
| 2007/0290790 A1 | 12/2007 | Miller et al. |
| 2008/0132100 A1 | 6/2008 | Craig |
| 2009/0085717 A1 | 4/2009 | Kirkjan |
| 2009/0320537 A1 | 12/2009 | Alexander |
| 2010/0031714 A1 | 2/2010 | Brown et al. |
| 2010/0283576 A1 | 11/2010 | Loughlin et al. |
| 2010/0307206 A1 | 12/2010 | Taylor et al. |
| 2011/0050390 A1 | 3/2011 | Denison et al. |
| 2011/0050391 A1 | 3/2011 | Denison et al. |
| 2011/0087370 A1 | 4/2011 | Denison et al. |
| 2011/0156866 A1 | 6/2011 | Denison et al. |
| 2011/0187496 A1 | 8/2011 | Denison et al. |
| 2011/0210818 A1 | 9/2011 | Denison et al. |
| 2011/0276609 A1 | 11/2011 | Denison |
| 2011/0285501 A1 | 11/2011 | Chen |
| 2012/0119877 A1 | 5/2012 | Ng et al. |
| 2013/0000366 A1 | 1/2013 | Martel et al. |
| 2013/0055773 A1 | 3/2013 | Li |
| 2013/0184872 A1 | 7/2013 | Chen et al. |
| 2013/0255335 A1 | 10/2013 | Jonely |
| 2014/0250956 A1 | 9/2014 | Chong |
| 2014/0338409 A1 | 11/2014 | Kraus et al. |
| 2014/0375422 A1 | 12/2014 | Huber et al. |
| 2015/0027178 A1 | 1/2015 | Scalisi |
| 2015/0101369 A1* | 4/2015 | Scalisi .................. E05B 47/026 292/164 |
| 2015/0101370 A1 | 4/2015 | Russo et al. |
| 2015/0170447 A1 | 6/2015 | Buzhardt |
| 2015/0211283 A1 | 7/2015 | Meeker et al. |
| 2015/0240529 A1 | 8/2015 | Dore Vasudevan et al. |
| 2015/0262440 A1 | 9/2015 | Gartner |
| 2015/0275550 A1 | 10/2015 | Burrus et al. |
| 2015/0279136 A1 | 10/2015 | Lovett et al. |
| 2015/0279137 A1 | 10/2015 | Bacon |
| 2015/0281228 A1 | 10/2015 | Rettig et al. |
| 2016/0133071 A1 | 5/2016 | Henderson |
| 2018/0044942 A1* | 2/2018 | Li ........................... E05B 45/06 |

(56) References Cited

U.S. PATENT DOCUMENTS

FOREIGN PATENT DOCUMENTS

| | | | |
|---|---|---|---|
| CN | 101709611 A | 5/2010 |
| CN | 201605899 U | 10/2010 |
| CN | 102071838 A | 5/2011 |
| CN | 102071838 B | 10/2012 |
| CN | 202718473 U | 2/2013 |
| CN | 203403733 U | 1/2014 |
| EP | 0877135 A2 | 11/1998 |
| EP | 2728092 A2 | 5/2014 |
| EP | 2775459 A2 | 9/2014 |
| EP | 2935732 A2 | 10/2015 |
| GB | 2397613 A | 7/2004 |
| GB | 2448482 A | 10/2008 |
| GB | 2495848 A | 4/2013 |
| JP | S54142288 A | 10/1979 |
| JP | H05084799 A | 4/1993 |
| JP | H07004734 | 1/1995 |
| JP | 2001283356 A | 10/2001 |
| JP | 2004183204 A | 7/2004 |
| JP | 2008082038 A | 4/2008 |
| JP | 2009169857 A | 7/2009 |
| JP | 2010126966 A | 6/2010 |
| JP | 2013130040 A | 7/2013 |
| JP | 2016505743 A | 2/2016 |
| JP | 2016532795 A | 10/2016 |
| JP | 2016188501 A | 11/2016 |
| WO | 9211430 A1 | 7/1992 |
| WO | 9929987 A1 | 6/1999 |
| WO | 2009157618 A1 | 12/2009 |
| WO | 2015010004 A1 | 1/2015 |
| WO | 2015101210 A1 | 7/2015 |

OTHER PUBLICATIONS

Japanese Patent Office, Japanese Office Action in related Japanese Patent Application No. 2019-566265 dated Mar. 7, 2022; 4 pages.
European Patent Office, European Examination Report in related European Patent Application No. 18810451.7 dated May 24, 2022; 7 pages.
International Searching Authority, Search Report and Written Opinion issued in International Application No. PCT/US18/35309 dated Sep. 25, 2018 (13 pages).
European Search Report in related European Patent Application No. 18810451.7 (EP 3631126) dated Feb. 9, 2021; 14 pages.
European Supplemental Search Report and Opinion in related European Patent Application No. 18810451.7 (EP 3631126) dated Jun. 18, 2021; 18 pages.

* cited by examiner

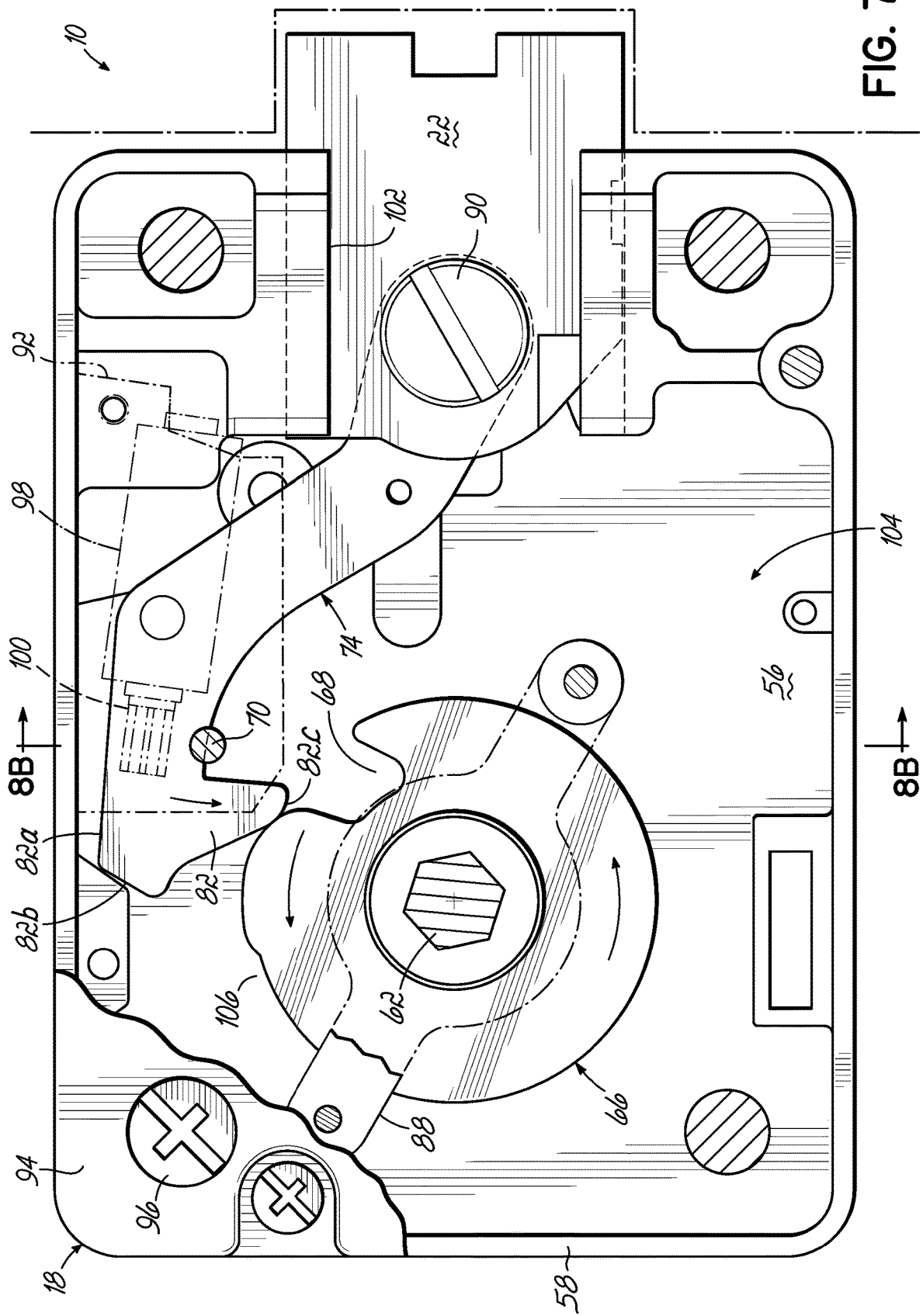

DEVICE AND METHODS FOR PROVIDING A LOCK FOR PREVENTING UNWANTED ACCESS TO A LOCKED ENCLOSURE

CROSS-REFERENCE TO RELATED APPLICATIONS

This application is a national phase entry of, and claims priority to, International Application No. PCT/US2018/035309, filed May 31, 2018, which claims priority to U.S. Provisional Application Ser. No. 62/514,135, filed on Jun. 2, 2017, the disclosures of which are hereby incorporated by reference in their entireties.

TECHNICAL FIELD

Embodiments relate generally to locks, and more specifically, to high security locks implemented for use in safes and other security structures or areas.

BACKGROUND

Items of extremely sensitive nature or very high proprietary value often must be stored securely in a safe or other containment device, with access to the items restricted to selected individuals given a predetermined combination code necessary to enable authorized unlocking thereof. It is essential to ensure against unauthorized unlocking of such safe containers by persons employing conventional safe-cracking techniques or sophisticated equipment for applying electrical or magnetic fields, high mechanical forces, or accelerations intended to manipulate elements of the locking mechanism to thereby open it.

Further, various applications of protecting safe containers from unauthorized access require that the locking mechanism satisfy a specified physical footprint while also being more highly susceptible to observing techniques attempting to determine the predetermined combination code as entered by authorized individuals that have possession of the predetermined combination code. Numerous locking mechanisms are known which employ various combinations of mechanical, electrical and magnetic elements both to ensure against unauthorized operation and to effect cooperative movements among the elements for authorized locking and unlocking operations. However, such conventional locking mechanisms employ approaches to enter the predetermined combination code that may be easily obtained by a casual observer. For example, a casual observer may easily determine the predetermined combination after the authorized individual correctly enters the predetermined combination code via a conventional push button and/or dial approach.

Embodiments, as more fully disclosed hereinbelow, meets these perceived needs at reasonable cost with a geometrically compact, electrically autonomous, locking mechanism.

SUMMARY

In accordance with an exemplary embodiment of the present invention, a self-powered lock for preventing unwanted opening of a locked enclosure is provided. The self-powered lock includes a housing and a lock bolt mounted for movement between a locked position and an unlocked position. A motor is included in the housing and has a rotatable output gear. The rack gear engages the rotatable output gear. A pin is coupled with the rack gear. A manually operable electricity generator generates electricity upon manual actuation by the user. The electricity generator is electrically connected to the motor to supply electricity thereto for operating the rotatable output gear. A lever arm is movable between the disengaged and engageable positions and operatively coupled to the lock bolt to move the lock bolt between the locked and unlocked positions. A rotary element is engageable with the lever arm in the engageable position thereof. Rotation of the rotary element when the rotary element is engaged with the lever arm moves the lock bolt between the locked and unlocked positions. The pin normally blocks the lever arm from moving from the disengaged position to the engageable position. When the motor is actuated by electricity from the electricity generator, the rotatable output gear moves the rack gear and the pin to unblock the lever arm and thereby allowing the lever arm to engage with the rotary element to allow a user to rotate the rotary element to move the lock bolt between the locked and unlocked positions.

According to another exemplary embodiment of the present invention, a self-powered lock is provided. The self-powered lock includes a housing and a lock bolt that is movable manually between a locked position and an unlocked position relative to the housing. A motor is included in the housing and has a rotatable output gear. A rack gear engages the rotatable output gear. A manually operable electricity generator generates electricity upon manual actuation by the user. The electricity generator is electrically connected to the motor to supply electricity thereto for operating the rotatable output gear. A lever arm is movable between the disengaged and engageable positions and is operatively coupled to the lock bolt to move the lock bolt between the locked and unlocked positions. A rotary element is engageable with the lever arm in the engageable position thereof. The rotation of the rotary element when the rotary element is engaged with the lever arm moves the lock bolt between the locked and unlocked positions. The pin normally blocks the lever arm from moving from the disengaged position to the engageable position. When the motor gear is actuated by electricity from the electricity generator, the rotatable output gear moves the rack gear and the pin to unblock the lever arm thereby allowing the lever arm to engage with the rotary element to allow a user to rotate the rotary element to move the lock bolt between the locked and unlocked positions. The spring biased pin is biased back into a position blocking the lever arm when the rotary element moves the lock bolt to the locked position.

Another exemplary embodiment of the present invention is a self-powered lock operable by a motor that includes a housing. A lock bolt movable manually between a locked position in which at least a portion of the lock bolt extends outward of the housing and an unlocked position in which the portion of the lock bolt is retracted within the housing. The motor has a rotatable output gear. A rack gear engages the rotatable output gear. A pin is mounted within the rack gear and has a portion extendible outward of the rack gear under a spring bias. A manually operable electricity generator generates electricity upon manual actuation by the user. The electricity generator is electrically connected to the motor to supply electricity thereto for operating the rotatable output gear. A lever arm is movable between disengaged and engageable positions and operatively coupled to the lock bolt to move the lock bolt between the locked and unlocked positions. A rotary element is engageable with the lever arm in the engageable position thereof. Rotation of the rotary element when the rotary element is engaged with the lever arm moves the lock bolt between the locked and unlocked positions. The pin normally blocks the lever arm from moving from the disengaged position to the engageable position. When the motor is actuated by electricity from the electricity generator, the rotatable output gear moves the rack gear and the pin to unblock the lever arm thereby allowing the lever arm to engage with the rotary element to allow a user to rotate the rotary element to move the lock bolt between the locked and unlocked positions. The spring biased pin is biased back into a position blocking the lever arm when the rotary element moves the lock bolt to the locked position.

In accordance with the present invention, yet another exemplary embodiment of a method for operating a self-powered lock. Electricity using a manually operable electricity generator is generated. The electricity is stored. The stored electricity is used to operate a motor having a rotatable output gear upon input of a correct combination code to the lock. The rotatable output gear is rotated with the motor using the stored electricity to move a rack gear and thereby unblock a lever arm. The lever arm is moved to an engageable position relative to a rotary element. The rotary element is rotated after engagement with the lever arm to move a lock bolt between a locked position and an unlocked position relative to the housing.

A further exemplary embodiment of the self-powered lock according to the present invention includes a method of operating a self-powered lock by a motor. Electricity is generated using a manually operable electricity generator. The electricity is stored. The stored electricity is used to operate a motor having a rotatable output gear upon input of a correct combination code to the lock. The rotatable output gear is rotated with the motor using the stored electricity to move a rack gear coupled with a pin and thereby unlocking a lever arm. The lever arm is moved to an engageable position relative to a rotary element. The rotary element is rotated after engagement with the lever arm to move a lock bolt between a locked position and an unlocked position relative to the housing.

A method for operating a self-powered lock is provided in accordance with the present invention. Electricity is generated using a manually operable electricity generator. The electricity is stored. The stored electricity is used to operate a motor having a rotatable output gear upon input of a correct combination code to the lock. The rotatable output gear is rotated with the motor using the stored electricity to move a rack gear coupled with a spring biased pin and thereby unblock a lever arm. The lever arm is moved to an engageable position relative to a rotary element. The rotary element is rotated after engagement with the lever arm to move a lock bolt between a locked position and an unlocked position relative to the housing. The spring biased pin is moved back into a position blocking the lever arm upon moving the lock bolt from the unlocked position to the locked position.

In an aspect of the invention, a lock configuration includes a generator configuration that is configured to internally generate generator power for the self-powered clock. The generated power is consumed by the lock configuration when each of a plurality of features is executed by lock configuration. At least one additional power source is configured to provide power to supplement the generator power for the lock configuration when the generator power is insufficient to execute at least one feature requested by the user to be executed by the lock configuration. A controller is configured to execute a plurality of actions in response to the at least one feature requested by the user to be executed by the lock configuration. Each of the actions ensures sufficient power is available for the lock configuration to execute the at least one feature requested by the user.

A lock configuration includes a power source that is configured to provide power for the lock configuration is also provided according to an exemplary embodiment of the invention. The generated power is consumed by the lock configuration when each of a plurality of features is executed by the lock configuration. An active touchscreen is configured to provide an interface for a user to enable the user to interact with the lock configuration. At least one feature to be executed by the lock configuration is requested by the user via the active touchscreen and feedback is provided to the user via the active touchscreen. A controller is configured to execute a plurality of actions in response to the at least one feature requested by the user via the active touchscreen. Each of the actions initiates the lock configuration to execute at least one feature requested by the user and provides feedback to the user via the active touchscreen.

A method for providing internal power to a lock configuration is provided in accordance with another exemplary embodiment of the invention. The method provides internally generating, from a generator configuration, generator power for the lock configuration. The internally generated power is consumed by the lock configuration when each of a plurality of features is executed by the lock configuration. Furthermore, the method provides providing power, from at least one additional power source, to supplement the generator power for the lock configuration when the generator power is insufficient to execute at least one feature requested by the user to be executed by the lock configuration. Accordingly, a controller executes a plurality of actions in response to at least one feature requested by the user to be executed by the lock configuration. Each of the actions ensures sufficient power is available for the lock configuration to execute the at least one feature requested by the user.

A further exemplary embodiment of the invention provides a method of executing a plurality of features associated with a lock configuration. The method provides generating, by a power source, generated power for the lock configuration. The generated power is consumed by the lock configuration when each of the features is executed by the lock configuration. The method provides providing an interface for a user, by an active touchscreen, to enable the user to interact with the lock configuration. At least one feature to be executed by the lock configuration is requested by the user via the active touchscreen. The method also provides providing feedback to the user via the active touchscreen. The method also provides executing a plurality of actions in response to the at least one feature requested by the user via the active touchscreen. Each of the actions initiates the lock configuration to execute the at least one feature requested by the user and provides feedback to the user via the active touchscreen.

A further exemplary embodiment of the invention provides a self-powered lock that includes a generator configuration that is configured to internally generate power for the self-powered lock. The internally generated power is consumed by the self-powered lock when each of a plurality of features is executed by the self-powered lock. A display is configured to provide an interface for a user to enable the user to engage an active touchscreen to interact with the self-powered lock. The display consumes a decreased amount of power that is provided by the generator power internally generated by the generator configuration. A controller is configured to execute a plurality of actions in response to at least one feature requested by the user via the display. Each of the actions initiates the self-powered lock to execute the at least one feature requested by the user and provides feedback to the user via the display.

A further exemplary embodiment of the invention provides a method for providing a decreased power interface to a user for a self-powered lock. The method provides internally generating, by a generator configuration, generator power for the self-powered lock. The internally generated power is consumed by the self-powered lock when each of a plurality of features is executed by the self-powered lock. An interface is provided for a user, by a display, to enable the user to engage an active touchscreen to interact with the self-powered lock. A decreased amount of power is consumed by the display that is provided by the generator power internally generated by the generator configuration. A plurality of actions in response to the at least one feature requested by the user via the display is executed. Each of the actions initiates the self-powered lock to execute the at least one feature requested by the user and provides feedback to the user via the display.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 7A-7D are front plan views showing the device of FIG. 1 and coaction of a variety of elements at various stages as the lock bolt moves between locked and unlocked positions.

DETAILED DESCRIPTION OF THE DRAWINGS

Figure 1:
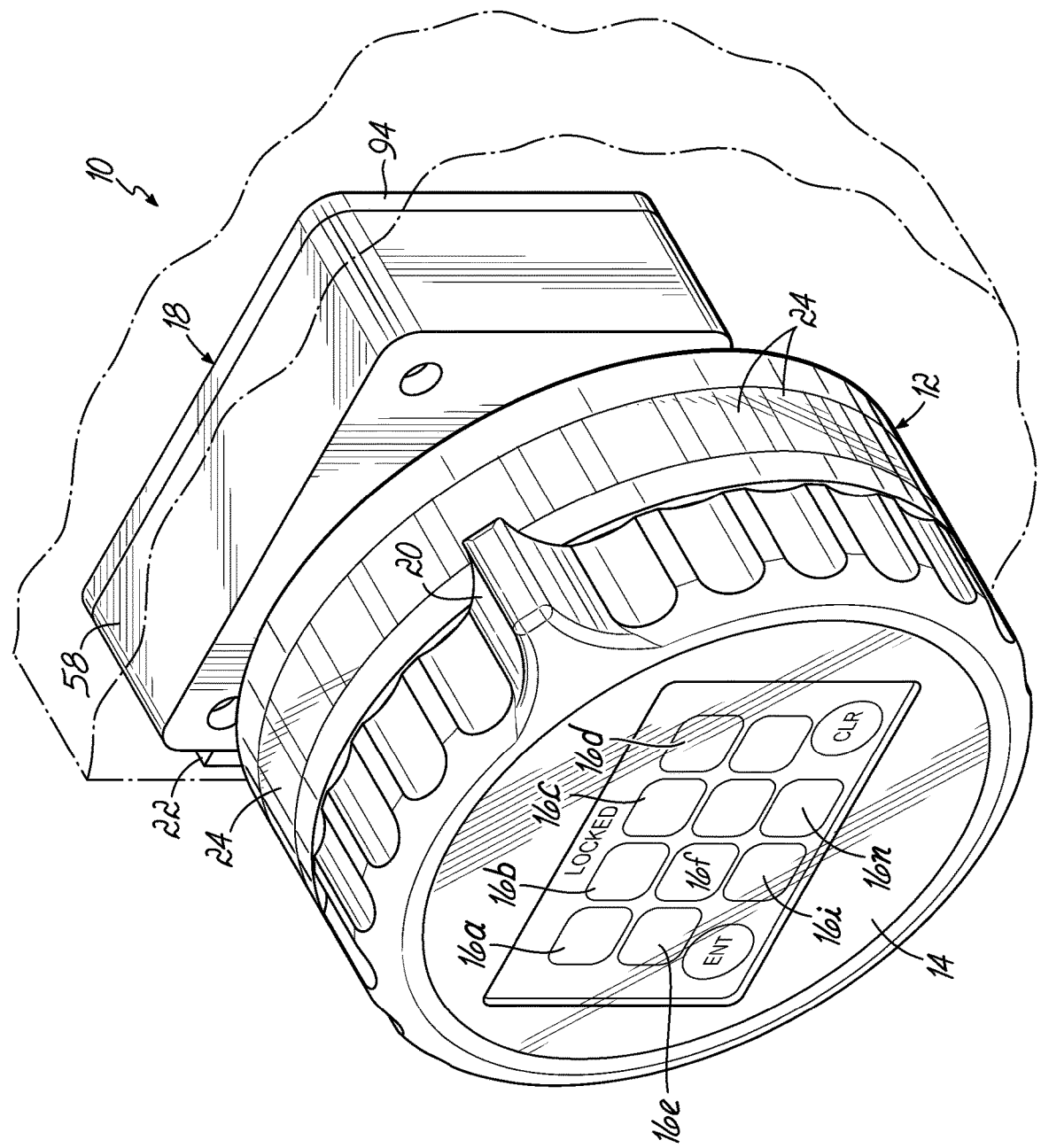
FIG. 1 is a perspective view of a touchscreen lock configuration for preventing unwanted opening of a locked enclosure and has an external user-accessible hub conveniently provided with an active touchscreen according to the invention.

This detailed description generally relates to the field of lock security. Specifically, a lock configuration is implemented for use in safe containers and other security structures or areas in order to protect items of extremely sensitive nature and/or of high proprietary value from access to unauthorized individuals. For example, the lock configuration may be implemented in a safe container that is located in a high level security zone in which unauthorized individuals may be aware that the location is housing several safe containers that may be protecting items that are coveted by the unauthorized individuals. The lock configuration is a configuration that remains in a locked state preventing access to the safe container and/or other security structures or areas and transitions to the unlocked state when instructed by the authorized individual.

In order to access the items housed in the safe container and protected by the lock configuration, authorized individuals that have authorization to access the protected items housed by the safe container may enter a predetermined combination code into the lock configuration that when entered correctly may unlock the lock configuration and allow access into the safe container to the authorized individuals. The predetermined combination code may be a predetermined sequence of characters that when entered by an authorized individual triggers the lock configuration to transfer from the locked state to the unlocked state and allow access into the safe container. Unless the predetermined combination code is correctly entered into the lock configuration, the lock configuration may remain in the locked state and prevent access into the safe container.

However, as noted above, unauthorized individuals that do not have authorization to access the protected items housed by the safe container may be aware of the location of the safe container and that the safe container is protecting items that are coveted by the unauthorized individuals. Such unauthorized individuals may attempt to determine the predetermined combination code as entered into the lock configuration by authorized individuals. For example, an unauthorized individual may casually observe the authorized individual enter the predetermined combination code into the lock configuration without the knowledge of the authorized individual. Conventional locking mechanisms, such as a conventional push button lock, provide the unauthorized individual an opportunity to determine the predetermined combination code as the authorized individual enters the predetermined combination code into the conventional locking mechanism. In such an example, as the authorized individual presses each button of the push button lock in the proper sequence of the predetermined combination code, the unauthorized individual may casually observe and record each button pressed by the authorized individual in the proper sequence without the knowledge of the authorized individual to determine the predetermined combination code.

Further, various applications of protecting safe containers from unauthorized access may require that the lock configuration satisfy a specified physical footprint. For example, standard safe containers have a standardized physical footprint that the lock configuration is to satisfy without encroaching beyond the physical footprint. Typically, as the sophistication of a conventional locking mechanism increases, the size of the physical footprint of the conventional locking mechanism also increases. For example, the amount of power required for a conventional sophisticated locking mechanism significantly increases and in order to provide adequate power, the physical footprint of the conventional sophisticated locking mechanism also increases in order to provide adequate power via a large battery and so on.

The lock configuration discussed in detail below implements an active touchscreen that may enable the authorized individual to interact with the lock configuration. The lock configuration may adjust the characters displayed by the active touchscreen such that the position of the characters and/or the actual characters displayed by the active touchscreen may change. In changing the position of the characters and/or the actual characters displayed by the active touchscreen, the capability of the unauthorized individual to determine the predetermined combination code entered by the authorized individual may be greatly diminished.

For example, the unauthorized individual may observe that the individual entered the predetermined combination code via the active touchscreen with each character positioned in a first position on the active touchscreen when the authorized individual entered the predetermined combination code. However, the lock configuration may adjust each character displayed by the active touchscreen to a second position when the unauthorized individual attempts to enter the predetermined combination code. The unauthorized individual may then fail to enter the correct predetermined combination code with each character positioned in a different position in the second position as compared to the position of each character in the first position when the authorized individual attempted to enter the predetermined combination code. Thus, the active touchscreen may provide increased sophistication to the lock configuration in preventing unauthorized individuals from obtaining the predetermined combination code while casually observing the authorized individual enter the predetermined combination code.

The lock configuration discussed below also implements an internal generator that is internal to the lock configuration to generate power to power the active touchscreen as well as providing power to the bolt retraction mechanism to transition the bolt retraction mechanism between the locked state and the unlocked state, accordingly. The generator enables power to be provided to the lock configuration while maintaining the physical footprint typically implemented by safe containers. The generator may generate power when the authorized user moves a power crank associated with the lock configuration. The power crank initiates a gear train included in the lock configuration when moved and the movement of the gear train may initiate the generator to generate power that may then be consumed by the lock configuration. The lock configuration may also include solar cells that capture solar energy that is then converted to power that may also be consumed by the lock configuration. Thus, the lock configuration may generate sufficient power without the need of large batteries and/or other power sources to power the active touchscreen, the bolt retraction mechanism, and/or each of the other features of the lock configuration and thereby maintaining the physical footprint of the lock configuration.

In the Detailed Description herein, references to "one embodiment", "an embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic may be described in connection with an embodiment, it may be within the knowledge of one of skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments which would be of significant utility. Therefore, the detailed description is not meant to limit the embodiments described below.

FIG. 1 is a diagram of a touchscreen lock configuration 10 for preventing unwanted opening of a locked enclosure and has an external user-accessible hub 12 conveniently provided with an active touchscreen 14. The hub 12 is attached to the casing 18 in any known manner that enables an authorized individual to interface with the hub 12 and have the lock body enclosed by the casing 18 to respond by having the bolt 22 move between the locked and the unlocked positions accordingly as would be appreciated by one having skilled in the relevant art given the description herein. For example, the hub 12 may be directly attached to the casing 18. In another example, the access apparatus such as a door may be disposed between the hub 12 and the casing 18.

As noted above, the touchscreen lock configuration 10 may enable the authorized user to engage the touchscreen lock configuration 10 via the active touchscreen 14. The touchscreen lock configuration 10 may adjust the position of each of the characters displayed by the active touchscreen 14 as well as adjusting the actual characters that are displayed by the active touchscreen 14 where the active touchscreen 14 may display characters with changed positions and/or changed characters actually displayed by the active touchscreen 14. In doing so, the touchscreen lock configuration 10 may prevent the unauthorized individual from casually observing the authorized individual enter the predetermined combination code without the knowledge of the authorized individual and determining the predetermined combination from observing the authorized individual entering the predetermined combination code.

A character may be any type of alphanumeric character and/or symbol that may be included in the predetermined combination code. Each of the characters may then be recognized by the authorized individual such that when the character is displayed by the active touchscreen 14 the authorized individual may recognize the character as being included in the predetermined combination code. The authorized individual may then select the character and the subsequent characters included in the predetermined combination code to transition the touchscreen lock configuration 10 into the unlocked state.

In an embodiment, the touchscreen lock configuration 10 may adjust each of the characters displayed by the active touchscreen 14 such that each of the characters are displayed in a different position each time an individual attempts to enter the predetermined combination code. For example, the first time that an individual attempts to enter the predetermined combination code, each of the characters may be displayed in a first set of respective positions 16($a$-$n$), where n is an integer equal to or greater than one. Then the second time that an individual attempts to enter the predetermined combination code each of the characters may be displayed in a second set of respective positions 16($a$-$n$) where each of the positions 16($a$-$n$) for each of the respective characters between the first set and the second set have changed.

In an embodiment, the touchscreen lock configuration 10 may adjust the actual characters displayed by the active touchscreen 14 such that different characters are displayed each time an individual attempts to enter the predetermined combination code. For example, the predetermined combination code is 5 0 7 5. The first time that an individual attempts to enter the predetermined combination code, each of the characters displayed by the respective positions 16(a-n) include A B 5 0 D E 7 5 W X. Then the second time each of the characters displayed by the respective positions 16(a-n) include 2 5 V * 0 Q S 7 ! 5.

Rather than have the unauthorized individual be able to casually observe the authorized individual adjust a conventional dial locking mechanism by tracking the direction of each turn of the dial as well as the amount of turns as well as the character that each turn ends on, the touchscreen lock configuration 10 may prevent the unauthorized individual from being able to do so by changing the position of the characters as well as the characters themselves that are displayed each time access to the touchscreen lock configuration 10 is attempted. The touchscreen lock configuration 10 may adjust the characters displayed by the active touchscreen 14 in any manner and at any frequency of attempts to access the touchscreen lock configuration 10 as would be appreciated by one having skilled in the relevant art given the description herein.

As noted above, the touchscreen lock configuration 10 may also include an internal generator to provide sufficient power to the active touchscreen 14, the bolt retraction mechanism, and each of the other features of the touchscreen lock configuration 10 without expanding beyond the physical footprint of the touchscreen lock configuration 10. Rather than incorporate large power sources, the touchscreen lock configuration includes 10 a gear assembly that is coupled to the internal generator as well as the power crank 20. Each time that the authorized individual requests to power up the touchscreen lock configuration 10, the authorized individual applies force to the power crank 20 and moves the power crank 20 in a manner that rotates the gear assembly. Each time the authorized individual moves the power crank 20 and rotates the gear assembly, the internal generator generates power and supplies the power to the touchscreen lock configuration 10. The authorized individual may continue to move the power crank 20 until the internal generator has generated sufficient power to for the touchscreen lock configuration 10 to adequately operate.

The touchscreen lock configuration 10 may also include a battery bank 26. In addition to the power generated by the internal generator, the battery bank 26 may also provide power to assist the touchscreen lock configuration 10 to adequately operate. Depending on the complexity of the gear train, the quantity of times required to move the power crank 20 to have the internal generator generate sufficient power for the touchscreen lock configuration 10 to adequately operate may increase. Rather than have the authorized individual move the power crank 20 an increased quantity of times, the battery bank 26 may also provide power so that the authorized individual may move the power crank a minimum amount of times to have the internal generator generate power that is then supplemented with power provided by the battery bank 26. The touchscreen lock configuration 10 may operate off of power solely generated by the internal generator, solely generated by the battery bank 26, and/or a combination of the internal generator and the battery bank 26 as would be appreciated by one having skilled in the relevant art given the description herein.

The touchscreen lock configuration 10 may also include a plurality of solar cells 24 to assist in providing power to the touchscreen lock configuration 10. Each of the solar cells 24 may absorb solar energy and then charge a capacitor bank that includes one or more capacitors with the absorbed energy. As the solar cells 24 absorb solar energy, each of the capacitors included in capacitor bank is charged until each of the capacitors included in the capacitor bank are charged to capacity. The capacitor bank may then discharge the stored power when the individual moves the power crank 20 to supplement the power generated by the internal generator such that the authorized individual may move the power crank 20 a minimum quantity of times to provide sufficient power to the touchscreen lock configuration 10 to adequately operate. In an embodiment, each of the solar cells may be positioned on the hub 12. However, the solar cells may be positioned anywhere on the touchscreen lock configuration and/or coupled to the touchscreen lock configuration 10 to adequately absorb solar energy and charge the capacitor bank as would be appreciated by one having skilled in the relevant art given the description herein.

Figure 2:
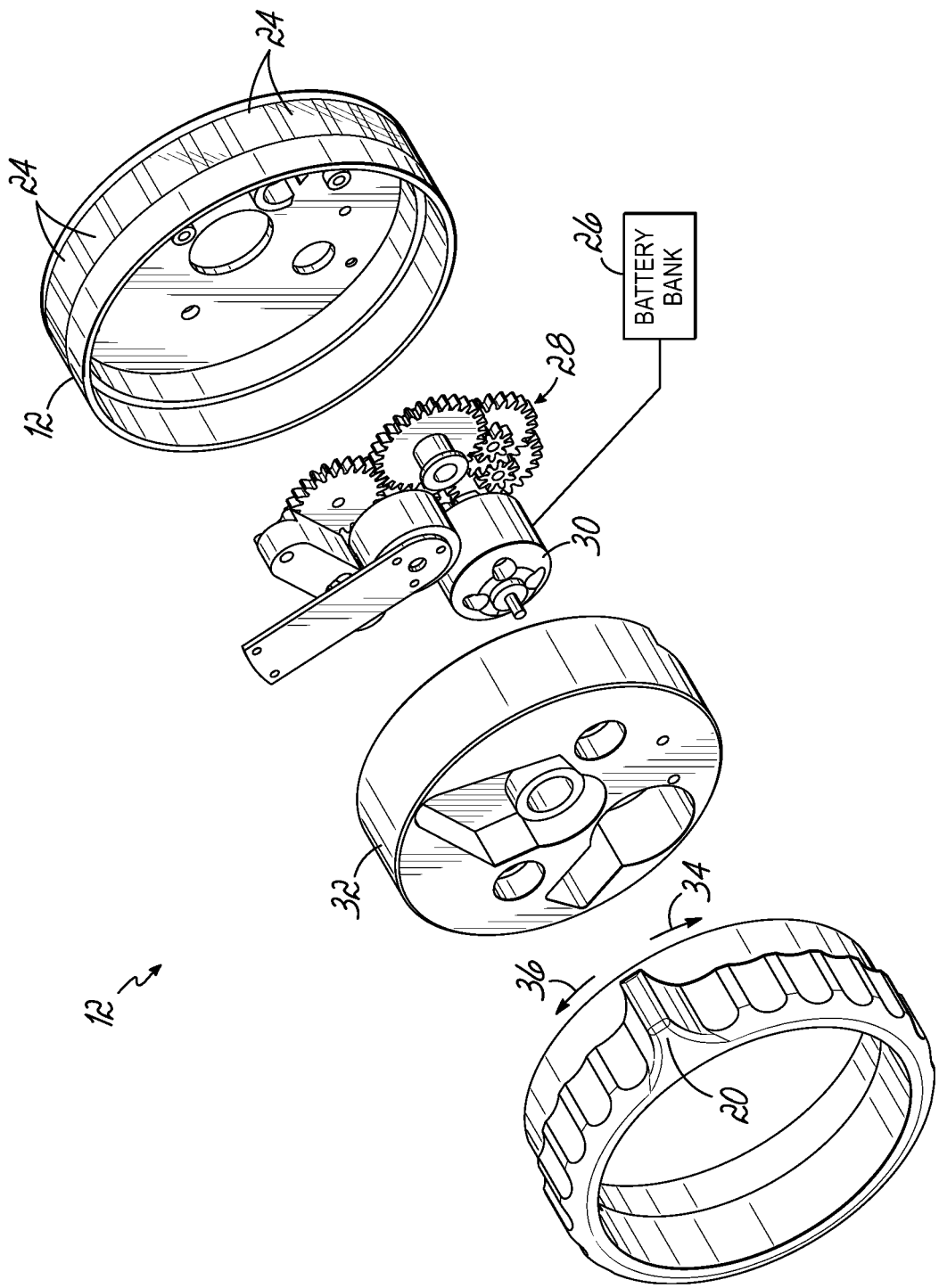
FIG. 2 is an exploded view of a power generation configuration for generating power for the touchscreen lock configuration.

FIG. 2 is an exploded view of the hub 12 for generating power for the touchscreen lock configuration 10. As noted above, the authorized individual may move the power crank 20 in order to activate the touchscreen lock configuration 10. The power crank 20 is coupled to the generator configuration 30 and the gear train 28 via the rotatable hub 32. Each time the authorized individual moves the power crank 20, the gear train 28 rotates as well as the generator configuration 30. With each rotation of the generator configuration 30 and the gear train 28, the generator configuration 30 generates power that is to be consumed by the touchscreen lock configuration 10.

In an embodiment, the authorized individual may move the power crank 20 in a downward direction 34. Each time the authorized individual moves the power crank 20 in the downward direction 34, the gear train 28 rotates as well as the generator configuration 30 resulting in power generated by the generator configuration 30. In another embodiment, the authorized individual may move the power crank 20 in an upward direction 36. Each time the authorized individual moves the power crank 20 in the upward direction 36, the gear train 28 rotates as well as the generator configuration 30 resulting in power generated by the generator configuration 30. In another embodiment, the authorized individual may move the power crank 20 in the downward direction 34 and the upward direction 36. Each time the individual moves the power crank 20 in the downward direction 34 and the upward direction 36, the gear train 28 rotates as well as the generator configuration 30 resulting in power generated by the generator configuration 30.

The quantity of times that the authorized individual is to move the power crank 20 to generate sufficient power for the touchscreen lock configuration 10 to adequately operate is dependent upon the complexity of the gear train 28. As the complexity of the gear train 28 increases, the quantity of times that the authorized individual is to move the power crank 20 to generate sufficient power for the touchscreen lock configuration 10 to adequately operate decreases. As the complexity of the gear train 28 decreases, the quantity of times that the authorized individual is to move the power crank 20 to generate sufficient power for the touchscreen lock configuration 10 to adequately operate increases.

For example, the individual may have to move the power crank 20 in the downward direction 34 a single time and in the upward direction 36 a single time to generate sufficient power for the touchscreen lock configuration 10 to adequately operate when the gear train 28 is of increased complexity. In another example, the individual may have to move the power crank 20 in the downward direction 34 five times and in the upward direction 36 five times to generate sufficient power for the touchscreen lock configuration 10 to adequately operate when the configuration is of decreased complexity.

Typically, the cost of the gear train 28 increases as the complexity increases. Thus, the power generated by the generator configuration 30 may be supplemented with the power provided by the solar cells 24 and the power provided by the battery bank 26 when the gear train 28 is of decreased complexity. Rather than have the authorized individual move the power crank 20 several times when the gear train 28 is of decreased complexity, the authorized individual may move the power crank 20 a time or two to have the generator configuration 30 generate power and then supplement that power with the power provided by the solar cells 24 and the battery bank 26. In doing so, sufficient power may be provided to the touchscreen lock configuration 10 to adequately operate with the use of large external power sources.

In an embodiment, the generator configuration 30 may be positioned in the hub 12 in front of the casing 18 relative to a front view of the touchscreen lock configuration 38. In another embodiment, the generator configuration 30 may be positioned behind the casing 18 relative to a front view of the touchscreen lock configuration 38. In another embodiment, a first generator may be positioned in the hub 13 in front of the casing 18 and a second generator may be positioned behind the casing 18 relative to a front view of the touchscreen lock configuration 38. In such an embodiment, wireless communication between the first generator and the second generator may occur via infrared signals transmitted between the first generator and the second generator. In another embodiment, a wired interface may exist between the first generator and the second generator.

Figure 3:
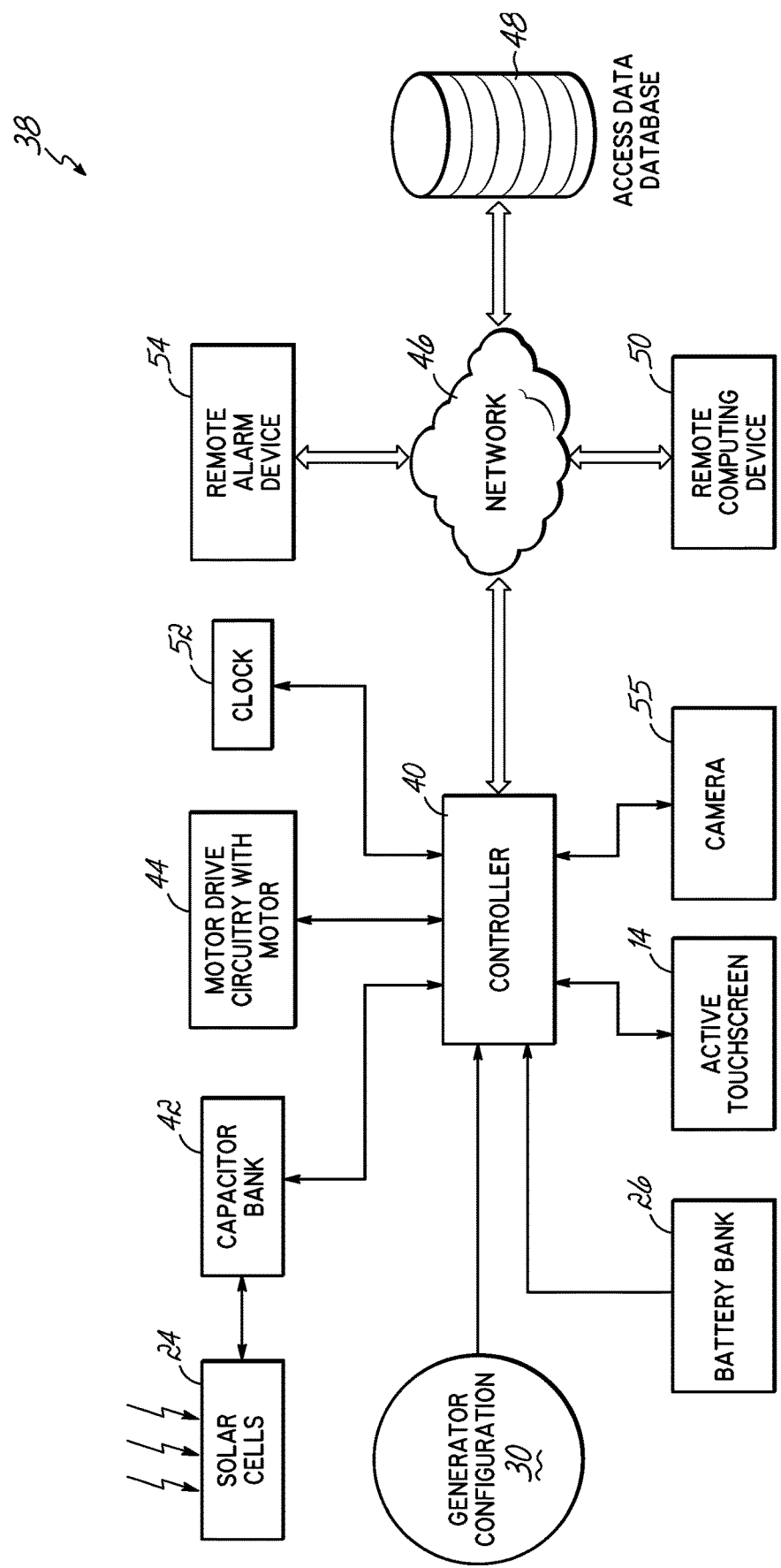
FIG. 3 is a schematic view of the touchscreen lock configuration.

FIG. 3 is a schematic view of the touchscreen lock configuration 38. As noted above, the generator configuration 30 may generate power upon the movement of the power crank 20 by the authorized individual. With each movement of the power crank 20 by the authorized individual, the power generated by the generator configuration 30 increases. The generator configuration 30 may provide sufficient power for the touchscreen lock configuration 38 to adequately operate after the individual has moved the power crank 20 a sufficient quantity of times to generate the sufficient amount of power. The solar cells 24 may absorb solar energy and charge the capacitor bank 42 to supplement the power generated by the generator configuration 30. The battery bank 26 may also supplement the power generated by the generator configuration. Thus, the touchscreen lock configuration 38 is self-powered in that power is provided by the generator configuration 30 such that large external power sources are not needed to provide sufficient power for the touchscreen lock configuration 38 to adequately operate while remaining within the physical footprint of the touchscreen lock configuration 38.

The controller 40 may monitor the power generated by the generator configuration 30. The controller 40 may monitor the power generated by the generator configuration 30 to determine when the power generated by the generator configuration 30 exceeds the threshold. The threshold is the amount of power required by the touchscreen lock configuration 38 to adequately operate such that each of the features of the touchscreen lock configuration 38 may be provided to the authorized individual when needed. For example, the threshold is the amount of power required by the touchscreen lock configuration 38 to adequately operate the active touchscreen 14 and provide each of the features displayed by the active touchscreen 14, to adequately operate the motor drive circuitry 44 of the bolt retraction mechanism and so on.

The controller 40 includes a processor, a memory, and a network interface, herein after referred to as a computing device or simply "computer". The controller may 40 may be any type of processing (or computing device). For example, the controller 40 may include a data information system, data management system, web server, and/or file transfer server. The controller 40 may also be a workstation, mobile device, computer, cluster of computers, set-top box or other computing device. In an embodiment, multiple modules may be implemented on the same computing device. In another embodiment, multiple modules may be implemented on different computing devices. Such a computing device may include software, firmware, hardware, or a combination thereof. Software may include one more applications on an operating system. Hardware can include, but is not limited to, a processor, memory, and/or graphical user interface display.

As the controller 40 monitors the power generated by the generator configuration 30, the controller 40 may maintain the active touchscreen 14, the motor drive circuitry 44 of the bolt retraction mechanism and/or each of the other features of the touchscreen lock configuration 38 in the deactivated state in order to conserve power consumption when the power generated by the generator configuration 30 remains below the threshold. After the power generated by the generator configuration 30 exceeds the threshold, the controller 40 may then activate the active touchscreen 14, the motor drive circuitry 44 of the bolt retraction mechanism and/or each of the other features of the touchscreen lock configuration 38. For example, the controller 40 may instruct the active touchscreen 14 to display the characters for the authorized individual to select appropriate characters to enter the predetermined combination code as well as display that the bolt 22 is in the "LOCKED" position.

The solar cells 24 capture solar energy from a solar source, such as a light source. The solar cells 24 may include a single and/or multiple solar cells that convert the solar energy into captured power that is stored by the capacitor bank 42. The solar cells 24 may capture the solar energy when the solar source is available and is radiating the solar energy in a sufficient manner for the solar cells 24 to capture. The solar cells 24 may include photovoltaic solar panels categorized as but not limited to mono-crystalline silicon, poly-crystalline silicon, amorphous silicon, cadmium telluride, copper indium selenide, thin-film layers, organic dyes, organic polymers, nanocrystals and/or any other type of photovoltaic solar panels that will be apparent to those skilled in the relevant art(s) without departing from the spirit and scope of the disclosure. The solar cells 24 may also be any shape and/or size that are sufficient to capture the solar energy that will be apparent to those skilled in the relevant art(s) without departing from the spirit and scope of the disclosure.

The controller 40 may also monitor the charge of the capacitor bank 42 in addition to the power generated by the generator configuration 30 to determine whether collectively the power generated by the generator configuration 30 and the charge of the capacitor bank 42 has exceeded the threshold. As the charge of the capacitor bank 42 and the power generated by the generator configuration 30 exceeds the threshold, the controller 40 may then activate the active touchscreen 14, the motor drive circuitry 44 of the bolt retraction mechanism and/or each of the other features of the touchscreen lock configuration 38. For example, the controller 40 may instruct the motor drive circuitry 44 of the bolt retraction mechanism to transfer from the locked position to the unlocked position when the authorized individual correctly enters the predetermined combination code via the active touchscreen 14 as well as instruct the active touchscreen 14 to display that the bolt 22 is in the "UNLOCKED" position.

In an embodiment, the solar cells 24 may capture sufficient solar energy from a solar source for the touchscreen lock configuration 38 to adequately execute each of the features as requested by the authorized individual. In doing so, the solar cells 24 may convert the solar energy to direct current (DC) power and store the DC power in a battery bank, such as the battery bank 26. The battery bank may have increased capacity as compared to the capacitor bank 42 to store the increased amount of DC power converted from the solar energy captured by the solar cells 24. The controller 40 may then operate the touchscreen lock configuration 38 based on the DC power stored in the battery bank as provided by the solar cells 24.

The battery bank 26 stores power. The battery bank 26 may store the power until requested by the controller 40 to provide the power. The battery bank 26 may include one or more lithium ion phosphate (LiFePO$_4$) and/or one or more lead acid cells. However, this example is not limiting, those skilled in the relevant art(s) may implement the battery bank 26 using other battery chemistries without departing from the scope and spirit of the present disclosure. The one or more cells of the battery bank 26 convert chemical energy into electrical energy via an electromechanical reaction.

The controller 40 may also monitor the power level of the battery bank 26 in addition to the charge of the capacitor bank 42 and the power generated by the generator configuration 30 to determine whether collectively the power generated by the generator configuration 30, the charge of the capacitor bank 42, and the power level of the battery bank 26 has exceeded the threshold. As the power level of the battery bank 26, the charge of the capacitor bank 42 and the power generated by the generator configuration 30 exceeds the threshold, the controller 40 may then activate the active touchscreen 14, the motor drive circuitry 44 of the bolt retraction mechanism and/or each of the other features of the touchscreen lock configuration 38. For example, the controller 40 may instruct the active touchscreen 14 to change the display to a different menu as requested by the authorized individual.

The controller 40 may determine which power is to be consumed by the touchscreen lock configuration 38. The controller 40 may determine whether the power generated by the generator configuration 30, the power stored in the capacitor bank 42, and/or the power stored in the battery bank 26 is to be consumed based on the power levels of the generator configuration 30, the capacitor bank 42, and the battery bank 26 as well as the features that the authorized individual is requesting. The controller 40 may assess the power required to adequately provide the requested features to the authorized individual as well as the respective power levels of the generator configuration 30, the capacitor bank 42, and the battery bank 26 to determine which of the power sources and/or combination thereof are to be accessed to execute requested features.

For example, the controller 40 may assess that the touchscreen lock configuration 38 is currently in a dormant state and not engaged by the authorized individual. In doing so, the controller 40 may assess that a low level of power is required and that the capacitor bank 42 currently has sufficient charge to power the active touchscreen 14 such that the active touchscreen 14 displays "LOCKED". The controller 40 may then have the capacitor bank 42 provide power to the active touchscreen 14 such that the active touchscreen 14 displays "LOCKED" without having to incorporate the power generated by the generator configuration 30 and the power stored by the battery bank 26.

In another example, the controller 40 may assess that the authorized individual is requesting to engage the active touchscreen 14 as well as requesting a transfer of access data from the touchscreen lock configuration 38 to the remote computing device 50. In doing so, the controller 40 may assess that high level of power is required and that the power generated by the generator 30 is insufficient to execute the required features by the authorized individual. However, the controller 40 may determine that collectively the power generated by the generator configuration 30, the current charge of the capacitor bank 42, and the power stored in the battery bank 26 is sufficient to execute the transfer of access data to the remote computing device 50. The controller 40 may then have the generator configuration 30, the capacitor bank 42, and the battery bank 26 provide power to execute the transfer of access data.

The touchscreen lock configuration 38 may incorporate any type of power source and/or combination of power sources to execute any feature and/or combination of features as would be appreciated by one having skilled in the relevant art given the description herein. For example, any feature and/or combination of features discussed in detail below may be executed by the controller 40 via the consumption of power provided by one or more generators, such as the generator configuration 30. In another example, any feature and/or combination of features discussed herein may be executed by the controller 40 via the consumption of power provided by one or more batteries, such as the battery bank 26. In another example, any feature and/or combination of features discussed in detail below may be executed by the controller via the consumption of power provided by solar power, such as the solar cells 24. As discussed in detail above, the controller 40 may also assess each feature and/or combination of features discussed in detail below that is to be executed by the touchscreen lock configuration 38 to determine the particular power source that is to provide the power for the execution of the particular feature and/or combination of features.

As noted above, the touchscreen lock configuration 38 includes the active touchscreen 14. The active touchscreen 14 is a touchscreen that enables the authorized individual to interact with the touchscreen lock configuration 38. The active touchscreen 14 is not limited to a single screenshot that is displayed to the authorized individual. Rather, the active touchscreen 14 may have several different screenshots that may be displayed to the authorized individual with each of the different screenshots providing different features for the authorized individual to select. The authorized individual may navigate through each of the different screenshots by selecting different menus provided by the active touchscreen 14 with each of the different menus having different features to select. The authorized individual may also navigate through each of the screenshots by incorporating arrow buttons and so on that enables the authorized individual to change the screenshot displayed by the active touchscreen 14. The authorized individual may also navigate through each of the screenshots by swiping across the active touchscreen 14, such as but not limited to swiping from the left to the right of the active touchscreen 14 and/or from the right to the left of the active touchscreen 14.

For example, the active touchscreen 14 is not limited to simply displaying the amount of characters that correspond to the amount of positions 16(a-n) displayed by the active touchscreen 14. In FIG. 1, the active touchscreen 14 displays ten different positions 16(a-n) in which each of the different positions 16(a-n) may display a different character for the authorized individual to select from when entering the predetermined combination code. However, rather than limiting the amount of characters displayed to the authorized individual to ten, the authorized individual may scroll through and change the screenshot displayed by the active touchscreen 14 such that another ten characters are displayed to the authorized individual. The authorized individual may scroll through and change the screenshot displayed by the active touchscreen 14 to such that another ten characters are displayed to the authorized individual.

In another example as shown in FIG. 1, the active touchscreen 14 displays ten different positions 16(a-n) for four different screenshots where the characters displayed in each of the ten different positions 16(a-n) differ in each of the four different screenshots. A first screenshot may display the NUMBER characters of 0 through 9 in each of the ten different positions 16(a-n). The first screenshot may be the default screenshot where upon startup of the touchscreen lock configuration 38, the initial screenshot displayed by the active touchscreen 14 may be the screenshot displaying the NUMBER characters 0 through 9. Each time that the active touchscreen 14 displays the first screenshot displaying the NUMBER characters 0 through 9, the position 16(a-n) of each of the NUMBER characters 0 through 9 may be randomly changed such that the position 16(a-n) of each of the NUMBER characters 0 through 9 displayed by the active touchscreen 14 changes.

The second screenshot that is displayed by the active touchscreen 14 may display the LETTER characters A through J in each of the ten different positions 16(a-n). The second screenshot may display the LETTER characters A through J as uppercase letters, lowercase letters, and/or any combination thereof. The authorized individual may transition the LETTER characters A through J that are displayed as uppercase letters and/or lowercase letters via the active touchscreen display 14. Each time that the active touchscreen 14 displays the second screenshot displaying the LETTER characters A through J, the position 16(a-n) of each of the LETTER characters A through J may be randomly changed such that the position 16(a-n) of each of the LETTER characters A through J displayed by the active touchscreen 14 changes.

The third screenshot that is displayed by the active touchscreen 14 may display the LETTER characters K through T in each of the ten different positions 16(a-n). The third screenshot may display the LETTER characters K through T as uppercase letters, lowercase letters, and/or any combination thereof. The authorized individual may transition the LETTER characters K through T as uppercase letters and/or lowercase letters via the active touchscreen display 14. Each time that the active touchscreen 14 displays the third screenshot displaying the LETTER characters K through T, the position 16(a-n) of each of the LETTER characters K through T may be randomly changed such that the position 16(a-n) of each of the LETTER characters K through T displayed by the active touchscreen 14 changes.

The fourth screenshot that is displayed by the active touchscreen 14 may display the LETTER characters U through Z in each of the ten different positions 16(a-n). The fourth screenshot may display the LETTER characters U through Z as uppercase letters, lowercase letters, and/or any combination thereof. The authorized individual may transition the LETTER characters U through Z as uppercase letters and/or lowercase letters via the active touchscreen display 14. Each time the active touchscreen 14 displays the fourth screenshot displaying the LETTER characters U through Z, the position 16(a-n) of each of the LETTER characters U through Z may be randomly changed such that the position 16(a-n) of each of the LETTER characters U through Z displayed by the active touchscreen 14 changes.

The active touchscreen 14 may also display SPECIAL characters in the positions 16(a-n) where the SPECIAL characters include characters that are not NUMBER characters and/or LETTER characters such as but not limited to characters of @, $ # and so on. Each time the active touchscreen 14 displays the screenshot displaying the SPECIAL characters, the position 16(a-n) of each of the SPECIAL characters may be randomly changed such that the position 16(a-n) of each of the SPECIAL characters displayed by the active touchscreen 14 changes. The active touchscreen 14 may also display CHINESE and/or ARABIC characters in the positions 16(a-n).

In such an example, the categorizing of characters by different screenshots enables the position 16(a-n) of each of the characters to be changed per screenshot. Rather than the active touchscreen 14 displaying a large quantity of characters at a time and then randomly changing the position 16(a-n) of each of the characters, a lesser quantity of characters may be displayed in each of the different screenshots with the position 16(a-n) of each of the characters displayed in each of the different screenshots being changed. This may enable the authorized individual to have less difficulty in identifying each of the characters included in the predetermined combination each time the authorized individual attempts to enter the predetermined combination code. For example, the authorized individual may identify the position 16(a-n) of two characters included in the predetermined combination code as displayed in each of the four different screenshots each displaying ten characters in ten positions 16(a-n) rather than having to identify the position 16(a-n) of all eight characters as display amongst forty different characters displayed in a single screenshot.

Further, the flexibility in displaying lesser quantity of characters that is spread across different screenshots enables a predetermined combination code to be implemented that incorporates a large quantity of characters to decrease the risk of the unauthorized individual from determining the predetermined combination code while also enabling a predetermined combination code to be selected that may be easily remembered by the authorized individual. For example, a forty-three character predetermined combination code that includes a sequence of characters that has no relation to each other may be difficult for the authorized individual to remember. However, a forty-three character predetermined combination code that includes the sequence of characters of "The quick brown fox jumps over the lazy dog 2 @ 3:00 PM." may be identified by the authorized individual as a sentence that the authorized individual may memorize as opposed to a string of forty-three characters. The likelihood of the unauthorized individual from determining the predetermined combination code is decreased due to the increased quantity of characters included in the predetermined combination code while the ease of the authorized individual in remembering the predetermined combination code is also increased.

The characters included in a predetermined combination code and displayed in each of the different positions 16(a-n) and different screenshots by the active touchscreen 14 may include any quantity of characters and displayed in any position 16(a-n) amongst any of the different screens shots as would be appreciated by one having skilled in the relevant art given the description herein. The controller 40 may be programmed such that the predetermined combination code may include any combination of characters that is to be entered in any designated sequence as required by the controller 40. The controller 40 may also be programmed to prevent different sequences of characters such as "00 00 00" that may be highly susceptible to being determined by the unauthorized individual from being included in the predetermined combination code. The controller 40 may be programmed to include any type of rule associated with the types of characters and/or sequence of characters that may be included in the predetermined combination code as would be appreciated by one having skilled in the relevant art given the description herein.

In doing so, the characters included in the predetermined combination code are not limited to being selected from ten different characters and are also not limited to being displayed in in a single screenshot as displayed by the active touchscreen 14. The first and second character may be displayed in the first screenshot along with eight other characters and then the authorized individual may then have to scroll to a second screenshot that displays the remaining characters along with eight different characters not previously displayed in the first screenshot thereby greatly increasing the security of the touchscreen lock configuration 38.

In an embodiment, the authorized individual may directly touch the active touchscreen 14 as the authorized individual navigates through the features of the touchscreen lock configuration 14 and selects the features that the authorized individual requests to have executed by the touchscreen lock configuration 38. In another embodiment, the authorized individual may navigate through the features displayed by the active touchscreen 14 via a knob. The authorized individual may navigate through the features displayed by the active touchscreen 14 in any manner that enables the authorized individual to access each of the features of the touchscreen lock configuration 38 as would be appreciated by one having skilled in the relevant art given the description herein. The active touchscreen 14 may be any type of display device including but not limited to a touchscreen display, a liquid crystal display (LCD) screen, an electrophoretic display, and/or any other type of display that will be apparent from those skilled in the relevant art(s) without departing from the spirit and scope of the present disclosure. The active touchscreen 14 may also have low power requirements.

In an embodiment, the active touchscreen 14 may include an electrophoretic display, such as but not limited to an Eink® display. An electrophoretic display may include numerous microcapsules which each microcapsule including positively charged white particles and negatively charged black particles that are encapsulated in a clear fluid. As a positive voltage is applied to a particular microcapsule, the white particles rise to the surface of the display. As a negative voltage is applied to a particular microcapsule, the black particles rise to the surface of the display providing a representation as a black pigment appearing on the display that appears to be black ink on the display.

The electrophoretic display, or any other electronic display technology used for carrying out aspects of this invention, may have minimal power requirements in that the display consumes no power unless controller 40 changes the image that is displayed. The electrophoretic display does not require continuous signal controls to maintain the image that is displayed by the electrophoretic display and thereby does not require power to maintain the image that is displayed. It will be appreciated that any other display which is used in connection with a lock consistent herewith, including but not limited to an electrophoretic display, which functions in this general manner may be used for purposes of achieving similar capabilities in a low power lock such as the self-powered type disclosed herein. For example, after the authorized individual has transferred the touchscreen lock configuration 38 into the locked state, the controller instructs the electrophoretic display to change the content that is displayed to "LOCKED". The electrophoretic display may then continue to display "LOCKED" without consuming any power until the electrophoretic display is requested to change the content that is displayed by the controller 40. In doing so, the electrophoretic display may clearly display that the status of the touchscreen lock configuration 38 without consuming any power when the touchscreen lock configuration 38 is not engaged by the authorized individual.

The amount of power required to change the image that is displayed by the electrophoretic display as requested by the controller 40 is minimal. The controller 40 may request that different partitions of the electrophoretic display to change the color that is displayed by the microcapsules included in each different partition from white to black and/or black to white depending on the image that the controller 40 requests the electrophoretic display to display. As noted above, a positive voltage is applied to a particular microcapsule to have the white particles included in the microcapsule to rise to the surface of the display thereby displaying a "blank" in the particular partition that includes the microcapsules that have received a positive voltage. A negative voltage is applied to a particular microcapsule to have the black particles included in the microcapsule to rise to the surface of the display thereby displaying a "black pigment" in the particular partition that includes the microcapsules that have received the negative voltage.

The amount of positive voltage that is applied to the particular microcapsules to have the white particles rise to the surface rather than the black particles and the amount of negative voltage that is applied to the particular microcapsules to have the black particles rise to the surface rather than the white particles to change the image displayed by the electrophoretic display is minimal. For example, controller 40 may request that the electrophoretic display change from displaying the image of "LOCKED" to "UNLOCKED".

In doing so, the controller 40 may apply a positive voltage to the partitions included in the electrophoretic display that have microcapsules that are to transition from having black particles at the surface to having white particles at the surface such that the respective partitions transition from displaying "black pigment" to displaying a "blank" on the electrophoretic display. The controller 40 may also display a negative voltage to the partitions included in the electrophoretic display that have microcapsules that are to transition from having white particles at the surface to having black particles at the surface such that the respective partitions transition from displaying a "blank" to displaying a "black pigment". The amount of positive voltage and/or negative voltage applied to the requested microcapsules to change the image displayed be electrophoretic display from "LOCKED" to "UNLOCKED" may be as low as 3V at 40 mA and could range up beyond 9V. The amount of voltage and/or current to change the image displayed by the electrophoretic display may be any voltage and/or current required to have the required microcapsules have the appropriate black and/or white particles rise to the surface to change the image as would be appreciated by one having skilled in the relevant art given the description herein.

The electrophoretic display may be a reflective display in that the image displayed by the electrophoretic display may be viewed by the human eye from the ambient light surrounding the electrophoretic display reflecting from the electrophoretic display and received by the human eye. In doing so, the electrophoretic display does not require a backlight to project light through the electrophoretic display such that the image is then received by the human eye. In eliminating the need for a backlight, the electrophoretic display consumes even less power in displaying the image such that the image is adequately viewed by the human eye.

Thus, the active touchscreen 14 incorporated as an electrophoretic display may have sufficient power provided by the generator configuration 30 of the touchscreen lock configuration 38. In doing so, the active touchscreen 14 may display each of the images as instructed by the controller 40 to enable the authorized individual to adequately navigate through the active touchscreen 14 to satisfy the needs of the authorized individual in interfacing with the touchscreen lock configuration 38 without requiring additional power be provided by external power sources, thereby providing a self-powered touchscreen lock configuration 38.

As noted above, the controller 40 may instruct the active touchscreen 14 to display different characters each time the authorized individual attempts to enter the predetermined combination code as well as displaying the characters included in the predetermined combination code in different positions with each attempt to enter the predetermined combination code. In an embodiment, the controller 40 may incorporate a random number generator that randomly selects the characters that are to be displayed by the active touchscreen 14 as well as randomly selecting the position of the characters included in the predetermined combination code. In another embodiment, the controller 40 may have several different sequences stored with each sequence including a different set of characters that are displayed to the authorized user as well as each sequence including a different position of the characters included in the predetermined combination code. Each time the authorized individual attempts to enter the predetermined combination code, the controller 40 may select a different sequence of characters that is to be displayed to the authorized individual via the active touchscreen 14. The controller 40 may determine the characters to be displayed as well as the positioning of the characters included in the predetermined combination code in any manner that changes the characters displayed as well as the positioning of the characters included in the predetermined combination code as would be appreciated by one having skilled in the relevant art given the description herein.

For example, the authorized individual may attempt to enter the predetermined combination code of 5 0 7 0 2 by moving the power crank 20. The controller 40 may detect the movement of the power crank 20 from the generation of power by the generator configuration 30. The controller may then randomly select to display the following in the active touchscreen 14:

Q is positioned in position 16*a*
7 is positioned in position 16*b*
$ is positioned in position 16*c*
5 is positioned in position 16*d*
0 is positioned in position 16*e*
0 is positioned in position 16*f*
V is positioned in position 16*g*
G is positioned in position 16*h*
2 is positioned in position 16*i*
: is positioned in position in 16*n*

The authorized individual may then correctly press position 16*d*, position 16*e*, position 16*b*, position 16*f*, and position 16*i* via the active touchscreen 14 to enter the predetermined combination code of 5 0 7 0 2. The controller 40 then instructs the touchscreen lock configuration 38 to transfer from the locked state to the unlocked state thereby unlocking the touchscreen lock configuration 38. The controller 40 may then instruct the active touchscreen 14 to display "UNLOCKED" indicating that the touchscreen lock configuration 38 is in the unlocked state. The authorized individual may then engage the active touchscreen 14 requesting that the touchscreen lock configuration 38 to transition from the unlocked state to the locked state. The controller 40 may then instruct the touchscreen lock configuration 38 to transfer from the unlocked state to the locked state thereby locking the touchscreen lock configuration 38. The controller 40 may then instruct the active touchscreen to display "LOCKED" indicating that the touchscreen lock configuration 38 is in the locked state.

The authorized individual may then attempt to enter the predetermined combination code of 5 0 7 0 2 a second time by moving the power crank 20 a second time following the locking of the touchscreen lock configuration 38. The controller 40 may detect the movement of the power crank 20 from the generation of power by the generator configuration 30. The controller may then randomly select to display the following in the active touchscreen 14:

2 is positioned in position 16*a*
W is positioned in position 16*b*
7 is positioned in position 16*c*
8 is positioned in position 16*d*
T is positioned in position 16*e*
8 is positioned in position 16*f*
5 is positioned in position 16*g*
0 is positioned in position 16*h*
1 is positioned in position 16*i*
0 is positioned in position in 16*n*

The authorized individual then correctly press position 16*g*, position 16*h*, position 16*c*, position 16*n*, and position 16*a* via the active touchscreen 14 to enter the predetermined combination code of 5 0 7 0 2. The controller 40 then instructs the touchscreen lock configuration 30 from the locked state to the unlocked state thereby unlocking the touchscreen lock configuration 38. The controller 40 may then instruct the active touchscreen 14 to display "UNLOCKED" indicating that the touchscreen lock configuration 38 is in the unlocked state.

In doing so, an unauthorized individual that attempts to apply a fingerprint identification material on the active touchscreen 14 to determine predetermined combination code by identifying the positions 16(*a-n*) of the active touchscreen 14 that have fingerprints would be unsuccessful. The random changing of the positions of the predetermined combination code as displayed by the active touchscreen 14 enables the authorized individual to select different positions of the predetermined combination code with each attempt to unlock the touchscreen lock configuration 38. Thus, an unauthorized individual attempting to identify the positions that have fingerprints would be unsuccessful in attempting to identify the predetermined combination code from the fingerprints.

In an embodiment, the controller 40 may adjust the predetermined combination code on a periodic basis. The controller 40 may adjust the predetermined combination code on a periodic basis when several different authorized individuals have authorization to access the safe container and particularly when the different authorized individuals may be limited to accessing the safe container in a single instance. In doing so, the controller 40 may adjust the predetermined combination code on a periodic basis so that individuals initially authorized to access the safe container and then have that authorization revoked cannot return to the safe container and correctly enter the predetermined combination code into the active touchscreen 14. The controller 40 may adjust the predetermined combination code after a period of time expires, such as adjusting the predetermined combination code every 24 hours. The controller 40 may also adjust the predetermined code based on the quantity of times that the touchscreen lock configuration 38 has been successfully unlocked, such as adjusting the predetermined combination code each time that the touchscreen lock configuration 38 has been unlocked. The interfacing capabilities of the active touchscreen 14 may enable for the controller 40 to be easily programmed to provide this capability.

For example, the touchscreen lock configuration 38 may be positioned on a restroom located at a busy restaurant. In order to prevent unauthorized access to the restroom to non-patrons of the restaurant, the controller 40 may adjust the predetermined combination code each time a patron correctly enters the predetermined combination code into the active touchscreen 14 thereby unlocking the touchscreen lock configuration 38 and enabling access to the restroom. In such an example, the controller 40 may generate a first predetermined combination code that is presented to a first patron requesting access to the restroom. After the patron successfully enters the restroom and departs, the controller 40 may generate a second predetermined combination code to prevent that first patron from returning to the restroom at a later time by entering the first predetermined combination code.

In an embodiment, the controller 40 may provide access to a specific predetermined combination code at a specified time. In many applications, such as the banking industry, different individuals may have to have access to different safe containers where the different safe containers are positioned at different locations. For example, a teller that works at different bank branch locations may require access to a first safe container at a first branch location on a first date and then may require access to a second safe container second branch location on a second date. The controller 40 associated with the touchscreen lock configuration 38 may provide access to the predetermined combination code entered by the authorized individual based on the date that the authorized individual is to be given access to the safe container associated with the touchscreen lock configuration 38. The interfacing capabilities of the active touchscreen 14 may enable for the controller 40 to be easily programmed to provide this capability.

In the same example, the controller 40 of a touchscreen lock configuration 38 associated with a first bank branch location may be programmed to provide access to a teller that is associated with the predetermined combination code 20 32 40 on Mondays. After the teller enters the predetermined combination code 20 32 40 into the active touchscreen on Monday, the controller 40 may determine from the clock 52 that indeed that the teller associated with the predetermined combination code 20 32 40 is to be given access to the lock container positioned at the first bank branch location on Monday. The controller 40 may then instruct the touchscreen lock configuration 38 transfer into the unlocked state. A second controller of a second touchscreen lock configuration associated with a second bank branch location may be programmed to provide access to the teller that is associated with the predetermined combination code 20 32 40 on Tuesdays. The second controller may then provide access to the safe container in a similar manner after verifying from the clock 52 that the teller is attempting to access the safe container positioned at the second bank branch location on Tuesday.

In an embodiment, the controller 40 may require that multiple predetermined combination codes associated with multiple different authorized individuals correctly enter their respective predetermined combination codes into the active touchscreen 14 before the controller 40 instructs the touchscreen lock configuration 38 to transition into the unlocked state. For example, the controller 40 may require that a first authorized individual with a first predetermined combination code enter the first predetermined combination code correctly into the active touchscreen 14. The controller 40 may then require that a second authorized individual with a second predetermined combination code enter the second predetermined combination code correctly into the active touchscreen 14. The controller 40 may then instruct the touchscreen lock configuration 38 from the locked state to the unlocked state. The interfacing capabilities of the active touchscreen 14 may enable for the controller 40 to be easily programmed to provide this capability. For example, the authorized individual may navigate through the menu options displayed by the active touchscreen 14 and select the "dual user" mode and then enter the different predetermined combination codes into the active touchscreen 14 that the controller 40 is to provide access to when correctly entered.

The interfacing capabilities of the active touchscreen 14 may also provide useful feedback to the authorized individual in directing the authorized individual to correctly perform the proper actions to have the touchscreen lock configuration 38 execute the functions that that the authorized individual would like performed. Rather than providing a series of beeps as feedback to inform the authorized individual that the authorized individual correctly entered a predetermined combination code and so on as done in conventional lock configurations, the active touchscreen 14 of the touchscreen lock configuration 38 may provide visual feedback via the display of the active touchscreen 14.

For example, several different authorized individuals may have to enter several different predetermined combination codes before the controller 40 instructs the touchscreen lock configuration 38 to transition from the locked state to the unlocked state. The active touchscreen 14 may provide visual feedback as to when the first authorized individual is to enter the first predetermined combination code, when the second authorized individual is to enter the second predetermined combination code, when the third authorized individual is to provide the third predetermined combination code and so on. If an incorrect predetermined combination code is entered in the incorrect sequence, the active touchscreen 14 may clearly display what has been entered incorrectly and clearly instruct the authorized individual as to what action to take to correctly enter the correct predetermined combination code in the correct sequence.

In an embodiment, the controller 40 may not only instruct the touchscreen lock configuration 38 to transition from the locked state to the unlocked state when the correct predetermined combination code is entered into the active touchscreen 14 but may also require that the correct predetermined combination code be entered at a specified time and date. If the correct predetermined combination code is entered but not entered at the specified time and date, the controller 40 may refuse to instruct the touchscreen lock configuration 38 to transition the from the locked state to the unlocked state.

In doing so, the controller 40 may determine whether the predetermined combination code entered into the active touchscreen 14 is correct. If the correct predetermined combination code has been entered, the controller 40 may then determine the time and date that the correct predetermined combination code is to be given access to the lock container. The controller may receive the time and date from the clock 52 as to when the predetermined combination code is entered. The controller 40 may then compare the time and date provided by the clock 52 to the time and date stored by the controller 40 which is the time and date that the controller 40 is to provide access to the safe container. The controller 40 may instruct the touchscreen lock configuration 38 to transition from the locked state to the unlocked state when the predetermined combination code at the time and date not only matches the correct predetermined code but also matches the time and date that the controller 40 is to give access of the safe container to the authorized individual associated with the correct predetermined combination code. The controller 40 may instruct the touchscreen lock configuration 38 to maintain the locked state when the correct predetermined combination code is entered but the time and date in which the correct predetermined code is entered does not match the time and date that the controller 40 is to give access of the safe container to the individual associated with the correct predetermined combination code.

The interfacing capabilities of the active touchscreen 14 may enable for the controller 40 to be easily programmed to provide this capability. The active touchscreen 14 may prompt the authorized individual with a time lock function and prompt the authorized individual to enter the time and date that the controller 40 is to provide access to the safe container for the correct predetermined combination code.

In an embodiment, the controller 40 may incorporate a time delay before instructing the touchscreen lock configuration 38 to transition from the locked state to the unlocked state. Rather than immediately instructing the touchscreen lock configuration 38 to transition from the locked state to the unlocked state when the authorized individual correctly enters the predetermined combination code into the active touchscreen 14, the controller 40 may incorporate a time delay that prevents the authorized individual from gaining access to the lock container for an additional amount of time after the authorized individual correctly enters the predetermined combination code. The controller 40 may be programmed with a specified period of time to delay instructing the touchscreen lock configuration 38 to transition from the locked state to the unlocked state after the authorized individual correctly enters the predetermined combination code. After the authorized individual correctly enters the predetermined combination code, the controller 40 may access the clock 52 to determine when the time delay has expired. After the time delay has expired, the controller may then instruct the touchscreen lock configuration 38 to transition from the locked state to the unlocked state.

The time delay may prevent the unauthorized individual from forcing the authorized individual into entering the correct predetermined combination code. The unauthorized individual may threaten the authorized individual to enter the correct predetermined code. However, the controller 40 refuses to instruct the touchscreen lock configuration 38 to transition from the locked state to the unlocked state until the time delay as provided by the clock 52 has expired. In an embodiment, the controller 40 may instruct the active touchscreen 14 to display the countdown of the time delay so that the unauthorized individual may clearly identify that the controller 40 is not going to instruct the touchscreen lock configuration 38 to transition from the locked state to the unlocked state until the time delay expires. This may trigger the unauthorized individual to flee from the location of the safe container without obtaining the contents protected by the safe container to avoid getting captured by authorities. The interfacing capabilities of the active touchscreen 14 may enable for the controller 40 to be easily programmed to provide this capability.

In an embodiment, the controller 40 may instruct a remote alarm device 54 to sound an alarm when a predetermined alarm code is entered into active touchscreen 14 indicating that the authorized individual who entered the predetermined alarm code has been forced to enter the predetermined combination code by the unauthorized individual. The controller 40 may be programmed by the authorized individual with a predetermined alarm code that when entered into the active touchscreen 14, the controller 40 is to instruct the remote alarm device 54 to sound. The predetermined alarm code may be a code that when entered after the authorized individual enters the correct predetermined combination code triggers the controller 40 to not only instruct the touchscreen lock configuration 38 to transition from the locked state to the unlocked state but to also instruct the remote alarm device 54 to sound. In doing so, the authorized individual may not be harmed by the unauthorized individual as the remote alarm device 54 is located remote to the location of the touchscreen lock configuration 38 and the sounding of the remote alarm device may be unknown to the unauthorized individual.

The interfacing capabilities of the active touchscreen 14 may enable for the controller 40 to be easily programmed to change the predetermined alarm code. The authorized individual may easily interface with the active touchscreen 14 and change the predetermined alarm code at any time. Conventional lock configurations required that the actual mechanics of the lock be changed to change the predetermined alarm code which was a costly process.

In an embodiment, the controller 40 may track the authorized individuals that successfully access the safe container as well the attempts that failed to access the safe container. The controller 40 may track access data that is associated with each attempt to access the lock container via entering a predetermined combination code into the active touchscreen 14. Access data is data that is associated with the attempted access to the safe container such as but not limited to the authorized individual that accessed the safe container, the predetermined combination codes entered into the active touchscreen 14, the time and date in which each authorized individual successfully accessed the safe container, the time and date in which an incorrect predetermined combination code is entered into the active touchscreen and/or any other data that is associated with the access and/or attempted access of the lock container via the touchscreen lock configuration 38 as would be appreciated by one having skilled in the relevant art given the description herein.

The controller 40 may track the access data associated with authorized individuals based on the respective predetermined combination codes associated with each of the authorized individuals. As each authorized individual enters their respective corresponding combination code, the controller 40 may track the access data associated with that authorized individual and store that access data in the access data database 48. For example, the authorized individual may enter the predetermined combination code of 25 50 75 that is associated with the authorized individual. The controller 40 may then query the clock 52 to determine the time and date in which the authorized individual correctly entered the combination code 25 50 75 and the controller 40 instructed the touchscreen lock configuration 38 to transition from the locked state to the unlocked state. The controller 40 may also track time that the touchscreen lock configuration 38 transitioned into the unlocked state as provided by the clock 52 and the time that the touchscreen lock configuration 38 transitioned from the unlocked state to the locked state to determine the amount of time that the authorized individual had access to the safe container. The controller 40 may then provide the access data to the access data database 48 as associated with the predetermined combination of the individual.

The controller 40 may also track the access data associated with authorized individuals based on respective employee numbers associated with each of the authorized individuals. In such an instance, each of the authorized individuals may have access to the same predetermined combination code to enter into the active touchscreen 14 to gain access to the lock container. In order to differentiate between each of the authorized individuals that attempt to gain access to the lock container via the predetermined combination code, the controller 40 may require that each authorized individual enter a corresponding employee code in addition to the predetermined combination code.

For example, the controller 40 may require that a first authorized individual enter the employee number of 22 in addition to the predetermined combination code of 24 50 60 when attempting to gain access to the lock container. The controller 40 may then track the access data associated with the authorized individual with the employee number of 22 and store the access data in the access data database 48 as associated with the employee number of 22. A second authorized individual may then be required to enter the employee number of 15 in addition to the predetermined combination code of 24 50 60 when attempting to gain access to the lock container. The controller 40 may then track the access data associated with the authorized individual with the employee number of 15 and store the access data in the access data database 48 as associated with the employee number of 15.

In an embodiment, the controller 40 may provide access to the access data stored in the access data database 48 that is associated with the attempts to gain access to the safe container that is associated with the touchscreen lock configuration 38. A user, such a security specialist, a supervisor, and so on that has an invested interest in the attempted access to the safe container associated with the touchscreen lock configuration 38 may request to analyze the access data stored in the access data database. For example, a security specialist may request to analyze the last ten operations performed by the controller 40 to analyze the type of activity that is attempted with regard to the touchscreen lock configuration. The controller 40 may provide access to the access data as requested.

In doing so, the controller 40 may stream the access data via the network 46 to the access data database 48. Wireless communication may occur via one or more networks 46 such as the internet. In some embodiments of the present invention, the network 46 may include one or more wide area networks (WAN) or local area networks (LAN). The network may utilize one or more network technologies such as Ethernet, Fast Ethernet, Gigabit Ethernet, virtual private network (VPN), remote VPN access, a variant of IEEE 802.11 standard such as Wi-Fi, and the like. Communication over the network 46 takes place using one or more network communication protocols including reliable streaming protocols such as transmission control protocol (TCP). These examples are illustrative and not intended to limit the present invention. Wired connection communication may occur with but is not limited to a fiber optic connection, a coaxial cable connection, a copper cable connection, and/or any other direct wired connection that will be apparent from those skilled in the relevant art(s) without departing from the spirit and scope of the present disclosure. The transfer of the data may also occur via transferrable memory storage devices such as a thumb drive and/or any other transferrable memory storage device that will be apparent from those skilled in the relevant art(s) without departing from the spirit and scope of the present disclosure.

The user may then request access to the access data via the remote computing device 50. The remote computing device 50 includes a processor, a memory, and a network interface, herein after referred to as a computing device or simply "computer." For example, remote computing device 50 may be a workstation, smart phone, tablet, mobile device, computer, cluster of computers, or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

In an embodiment, the controller 40 may inform the remote computing device 50 each time that an individual whether the individual be authorized and/or unauthorized attempts to enter a predetermined combination code via the active touchscreen 40. Each time a predetermined combination code is entered via the active touchscreen 40 whether successfully and/or unsuccessfully, the controller 40 may inform the remote computing device 50 via the network 46 that such an attempt had been made. The controller 40 may transmit to the remote computing device 40 the access data associated with each attempt to enter the predetermined combination code. In doing so, the user of the remote computing device 50 may be notified of each attempt to enter the predetermined combination code immediately following each attempt as well as be informed of the access data of each attempt such that the user may assess whether the attempt to enter the predetermined combination code is authorized and to take any necessary action quickly after such an attempt.

In an embodiment, the controller 40 may instruct the camera 55 may capture an image of the individual whether authorized and/or unauthorized that attempts to enter the predetermined combination code whether successfully and/or unsuccessfully. Each time that an individual attempts to enter the predetermined combination code, the controller 40 may instruct the camera 55 to capture an image of the individual and then store the image of the individual in the access data database 48 as associated with the attempt to enter the predetermined combination code. In doing so, an actual image of the individual may be analyzed along with the other access data for each attempt to enter the predetermined combination code. In another embodiment, the controller 40 may instruct the camera 55 to capture an image of each individual that is within a distance of the touchscreen lock configuration 38.

Figure 4:
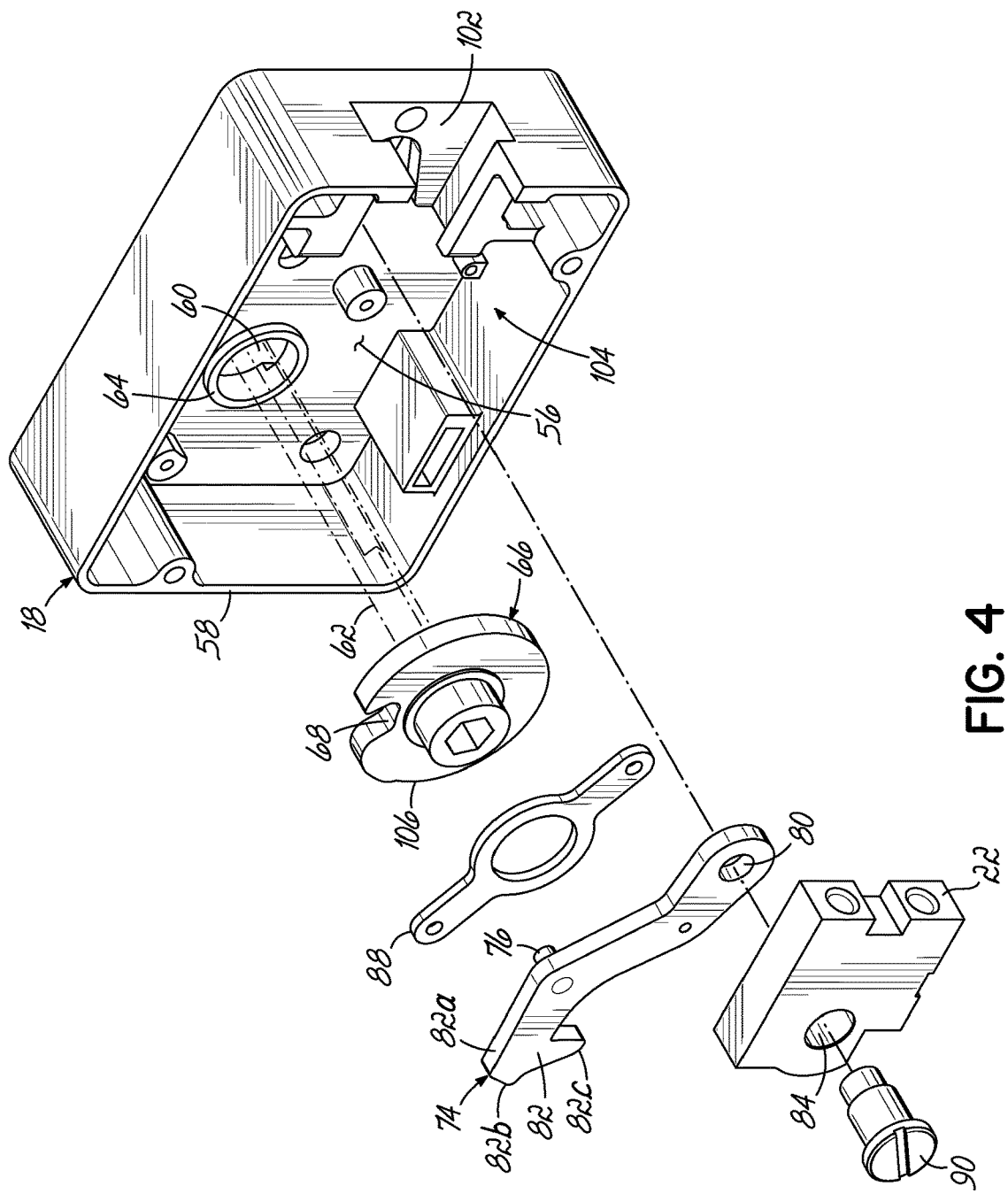
FIG. 4 is a disassembled perspective view of the lock configuration, looking at the lock configuration from the rear.
Figure 4:
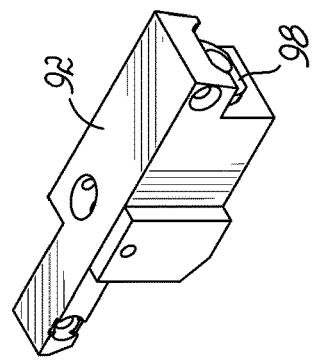
Figure 5:
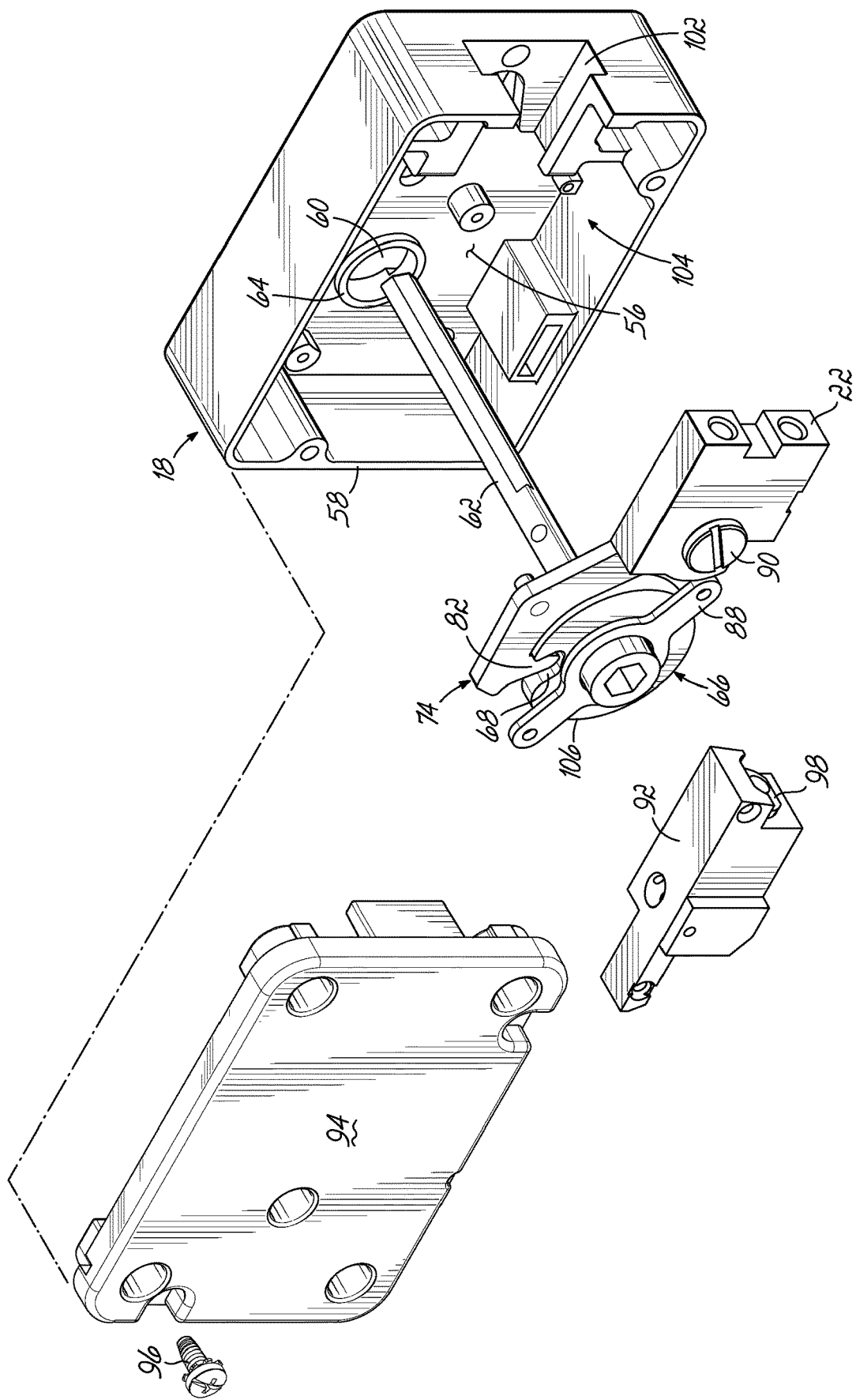
FIG. 5 is an exploded view of the touchscreen lock configuration where an aperture extends through the entire thickness of casing to closely accommodate therein the shaft extending from active touchscreen into a space defined an inside casing.

FIGS. 4 & 5 are exploded views of the touchscreen lock configuration 10 for preventing unwanted opening of a locked enclosure according to a preferred embodiment of this invention, as viewed in looking toward the inside surface 56 of casing 18. Persons of ordinary skill in the art can be expected to appreciate that the touchscreen lock configuration 10 can be mounted on a variety of access apparatuses, such as doors, on a variety of enclosures, such as safes, rooms, structures, and any other enclosure where it is desired to protect the contents from unintended access by locking the enclosure. Moreover, it is not critical to the utility of the present invention that touchscreen lock configuration 10 be mounted to a door since, without difficulty, the touchscreen lock configuration 10 can be easily mounted to a wall of an enclosure in such a manner that a lock bolt 22 projects in its locking position into the door, rather than the enclosure, to lock it to the body of the enclosure.

An aperture 60 extends through the entire thickness of casing 58 to closely accommodate therein shaft 62 as shown in FIG. 5 extending from active touchscreen 14 (see FIG. 1) into a space defined inside casing 58. In casing 58, there is provided an annular journal bearing 64 to closely receive and rotatably support shaft 62 via rotary element 66 projecting therethrough.

Figure 6B:
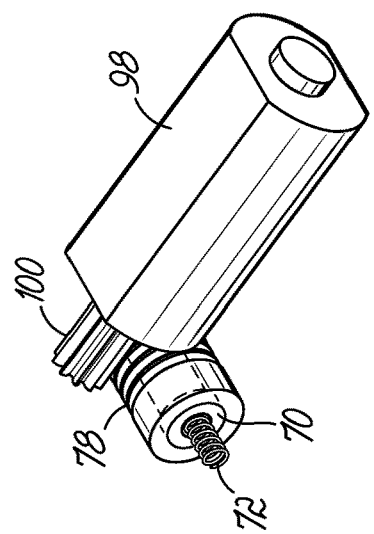
FIG. 6B is an assemble perspective view of the rotatable output gear and rack gear assembly of FIG. 6A.
Figure 6A:
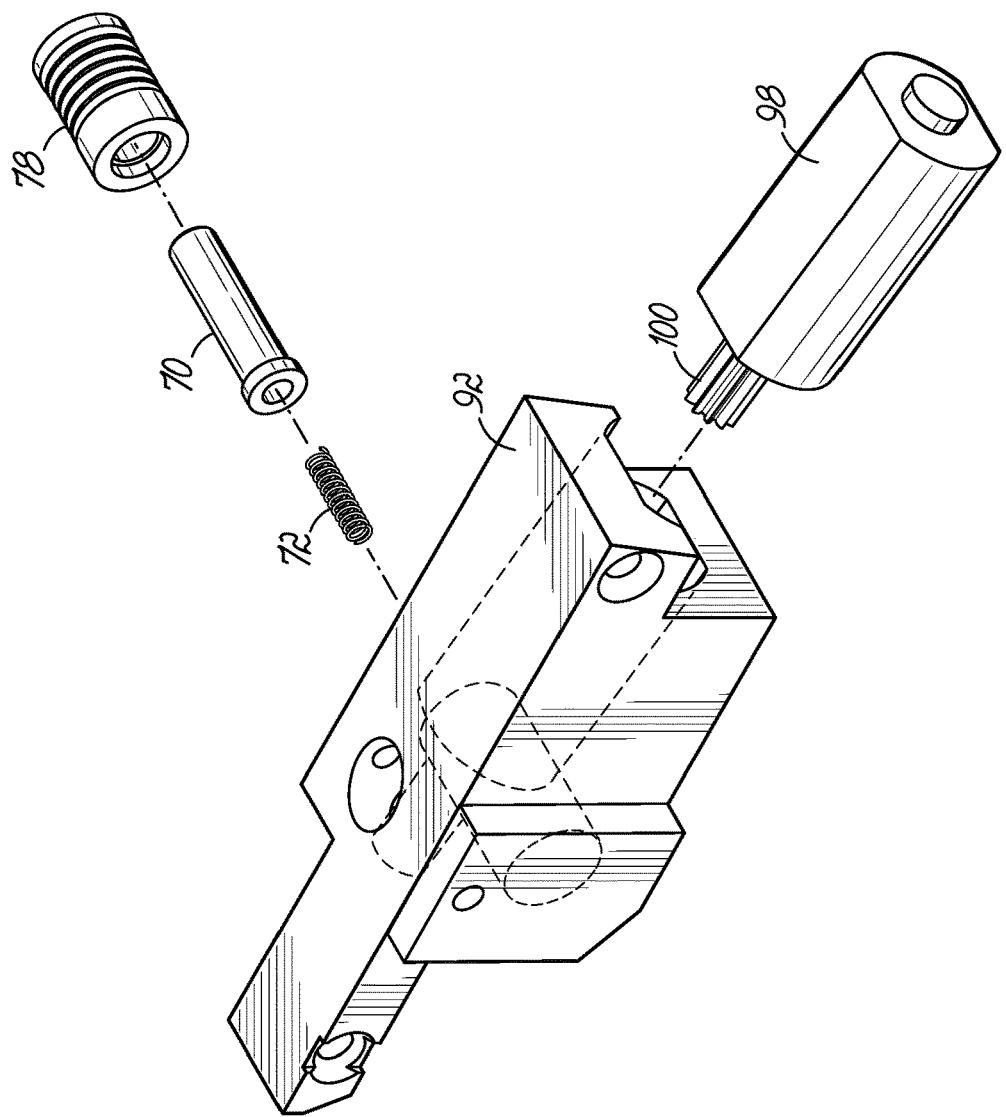
FIG. 6A is an exploded perspective view of the rotatable output gear and rack gear assembly.
Figure 9:
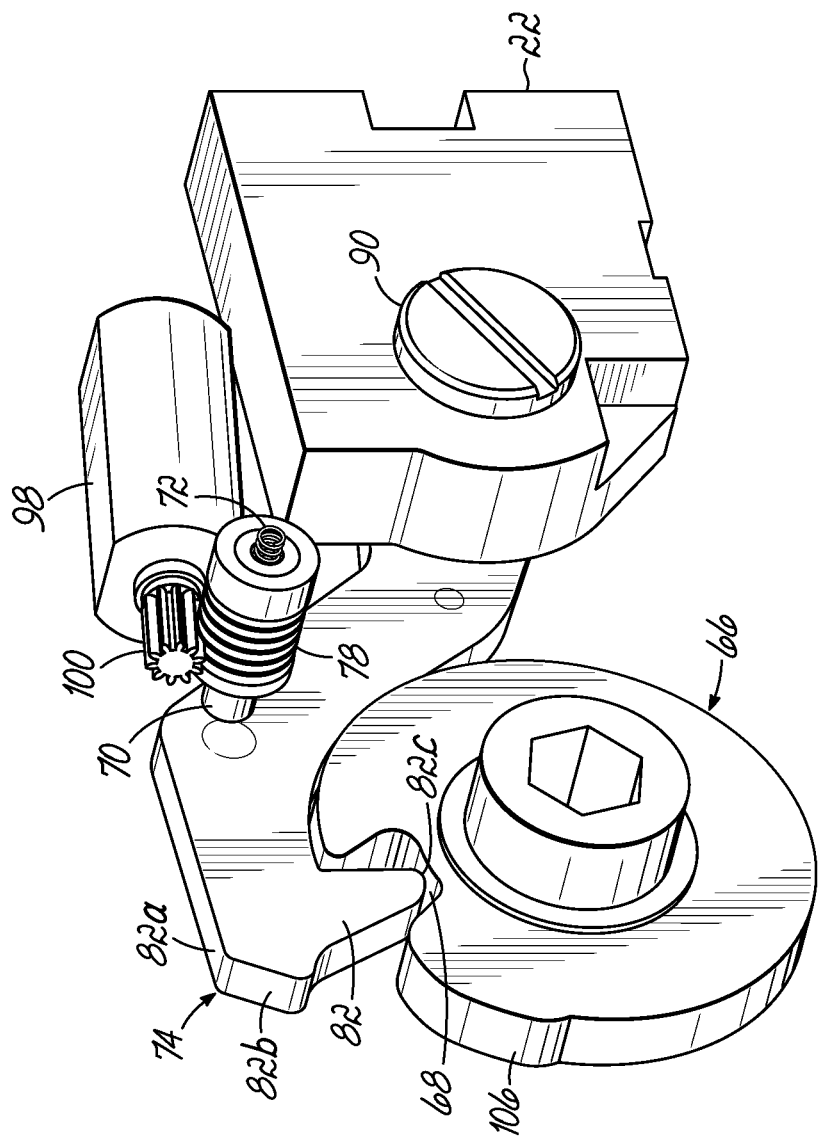
FIG. 9 is a perspective view of the motor configuration according to the invention.

The rotary element 66 has a cam notch 68. The cam notch 68 provides clearance for a pin 70 as shown in FIGS. 6A, 6B & 9 which is affixed to the shroud 92 and coupled to an extension spring 72. The extension spring 72 couples to a lever arm 74 at a lever aperture 76 by pin 70. As discussed below in more detail, the lever arm 74 includes a hook 82 that travels within the cam surface 67 and notch 68 of the rotary element 66 when the bolt 22 is in the unlocked position. The lever arm 74 includes an aperture 80 at one end and a hook 82 at the other end. The hook 82 has contiguous portions 82a, 82b and 82c. The lock bolt 22 has a pin (FIGS. 4 and 9) which receives the end of the lever arm 74 having the aperture 80 whereat the lever arm 74 is pivotably fixed such that the aperture 80 is situated concentrically relative to a pivot mounting aperture 84 of the lock bolt 22. The lever arm 74 is pivotable to engage with the cam notch 68 (see FIGS. 7A-7D) of the rotary element 66, as explained below in further detail.

A fastener 88 is coupled to the rotary element 66 and is mounted to the casing 58. The fastener 88 enables the rotary element 66 to rotate while engaging the lever arm 74 but remains stationary as the rotary element 66 rotates and the lever arm 74 moves relative to the rotation of the rotary element 66 as the fastener 88 is mounted to the casing 58. A pivot pin 90 is coupled to the bolt 22 by being inserted into the pivot mounting aperture 84 of the bolt 22 as well as the aperture 80 of the lever arm 74 enabling the lever arm 74 to drive the bolt 22 between the locked and unlocked positions. The shroud 92 protects and houses a rotatable output gear and rack gear assembly which includes the coupling of the rack gear 78 that encompasses the pin 70 and the spring 72 as well as the rotatable output gear 100 and the motor 98.

As seen in FIGS. 5, 6A and 6B, a shaft 62, rotatably coupled to the knob 32 (see FIG. 2), extends into casing 58. The lock bolt 22 is slidably supported by casing 58 to be projected outwardly into a locking position, or to be retracted substantially within casing 58 to an unlocking position, upon appropriate manual operation of the knob 32 (see FIG. 2) by a user. Casing 58 is provided with a detachable back wall 94, fixed to the remaining portion of casing 58 by fasteners 96, which also serve to provide support to various components of the touchscreen lock configuration 10 according to this invention.

The motor 98 and a rotatable output gear 100 are provided. The rotatable output gear 100 is meshable with and rotates a rack gear 78. A pin 70 is operatively coupled to the rack gear by a spring 72, the interaction of which is explained in more detail below with respect to FIGS. 7A-7D. As further shown in FIGS. 5, 6A, and 6B, shroud 92 houses the motor 98, rotatable output gear 78, the rack gear, the pin 70 and the spring 72 (see FIG. 6A). Shroud 92 assists in maintaining the position of motor 98 and also provides protection against access to the motor 98 and rotatable output gear 100 through the back wall 94.

Casing 58 is conveniently formed, e.g., by machining, molding or in an otherwise known manner, to provide a pair of guide slots 102 which are shaped, sized and disposed to closely accommodate lock bolt 22 in a sliding motion between its locked and unlocked positions. While an important object of this invention is to provide its locking function in a highly compact manner, the casing 58, lock bolt 22 and guide slots 102 are also be shaped and sized to provide the necessary strength to resist any foreseeable brute-force to open the locked enclosure. For example, although the locked enclosure may be made of highly tempered steel or alloy, the lock bolt 22 and other elements of the lock may be made of a softer metal, such as brass, or an alloy, such as "ZAMAK." However, it will be appreciated by persons of ordinary skill in the art that other known materials may be suitable for forming one or more elements of the lock.

Lock bolt 22 is provided with the pivot mounting aperture 84 into which is mounted a pivot 90, to pivotably connect the lever arm 74 to lock bolt 22. Thereby, the pivot 90 and lever arm 74 communicate a manual force for moving the lock bolt 22 along the guide slots 102 between locked and unlocked positions.

Lever arm 74 is provided with the hook 82 (see FIGS. 7A-7D) that enables the lever arm 74 to be engaged by cam notch 68 of rotary element 66 so as to be forcibly moved in conjunction with rotary element 66 caused to be slidingly moved as guided by the pivot pin 90. The distal portion of lever arm 74 extending beyond the location of lever aperture 76 is formed as the hook 82, the shape of which is provided with an outside edge having the plurality of contiguous portions 82a, 82b, 82c. The contiguous portion 82a, 82b, 82c coact with a downwardly depending fixed cam portion 68 formed at an inside surface of casing 58. This coaction, at different stages in the course of moving lock bolt 22 between its locked and unlocked positions, is best understood with successive reference to FIGS. 7A-7D and is described more fully hereinbelow.

As shown in FIG. 5, an end portion of shaft 62 which extends into casing 58, preferably has a square cross-section, to which is mounted the rotary element 66 via the matchingly shaped and sized central fitting aperture 60 (see FIG. 4). Accordingly, when the controller 40 instructs the motor drive circuitry 44 to apply a torque to motor 98 (see FIG. 1), the torque transmits to shaft 62 to thereby forcibly rotate rotary element 66. Fastener 88 fixes the rotary element 66 relative to the shaft 62. A split ring, for example, may be utilized to retain the rotary element 66 to shaft 62 in a known manner. Other known techniques or structures for retaining the rotary element 66 may be used. By this arrangement there is readily available, through rotary element 66, a motor driven torque at a point inside space 104 of casing 58, i.e., within the secure containment space 104 inside a locked enclosure.

FIGS. 6A and 6B show the configuration of the interaction of the rack gear 78, the pin 70, and the spring 72 engaging the rotatable output gear 100 as driven by the motor 98 and enclosed in the shroud 92. As described herein, the controller 40 instructs the motor drive circuitry 44 to apply electricity to the motor 98 when the authorized individual has satisfied the requirements of the controller 40 to provide access to the secure containment space 104 to the authorized individual. For example, the controller 40 instructs the motor drive circuitry 44 to apply electricity to the motor 98 when the authorized individual has correctly entered the predetermined combination code via the active touchscreen 14.

Figure 7A:
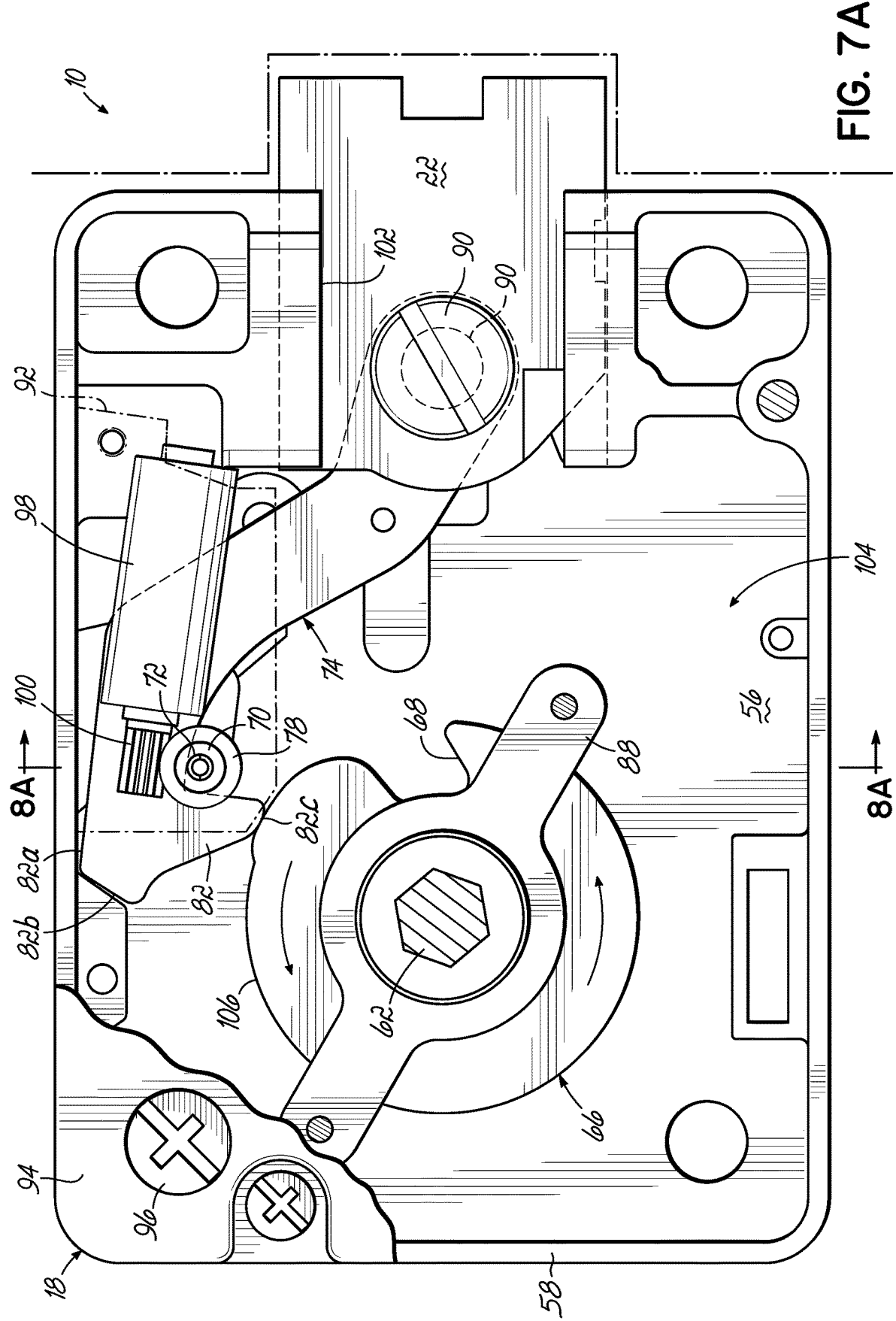
Figure 7C:
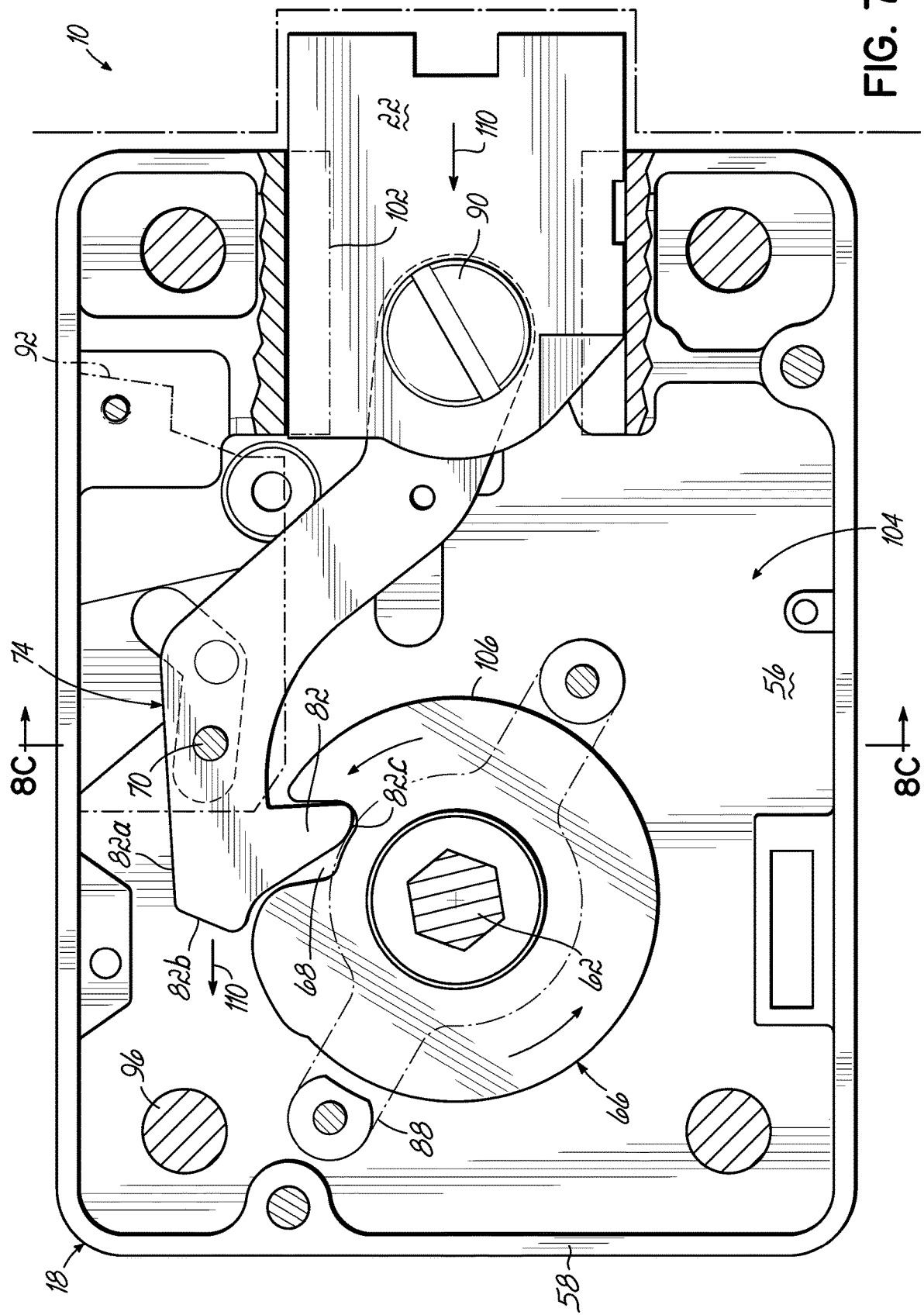
Figure 7D:
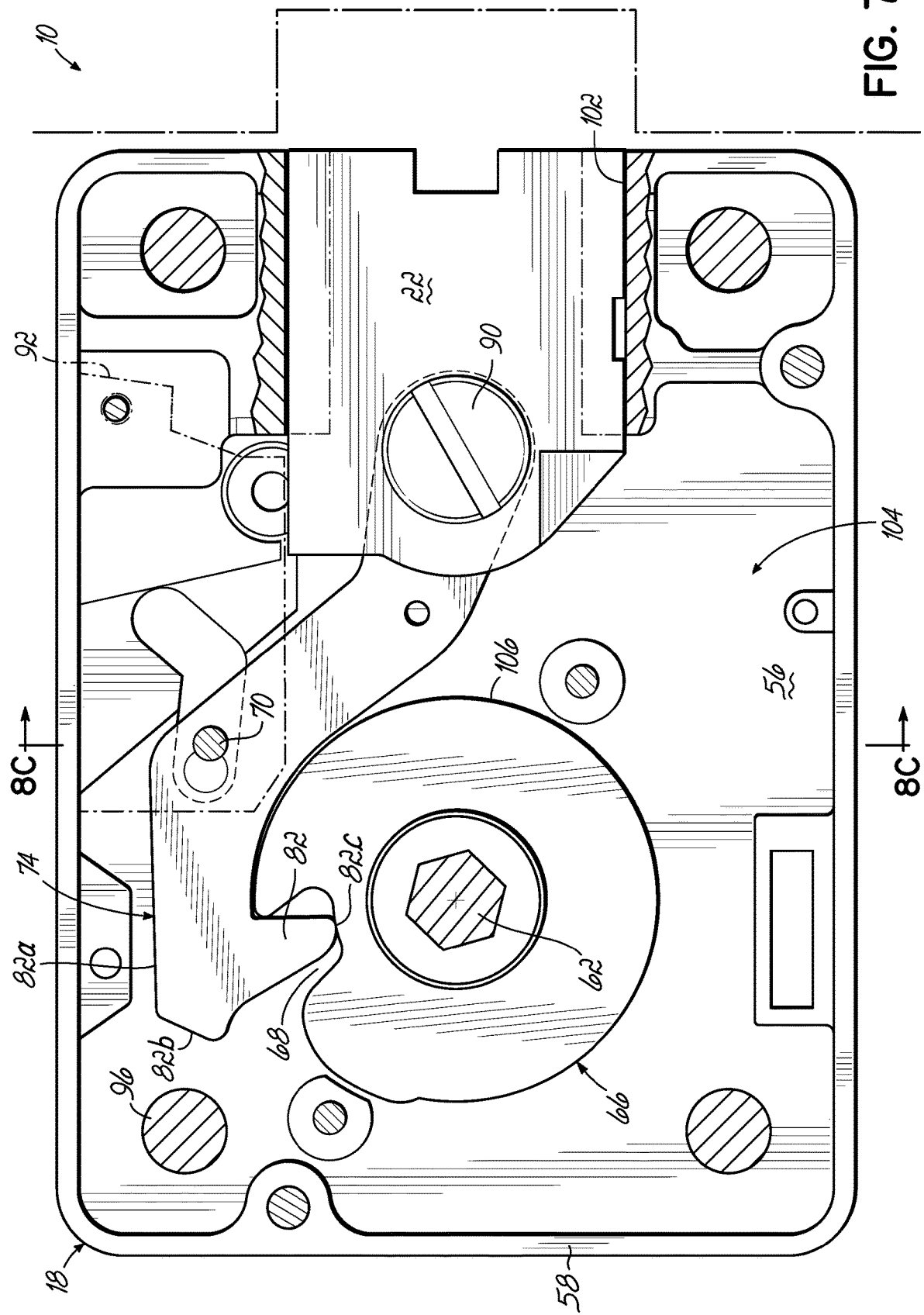

The electricity provided to the motor 98 by the motor drive circuitry 44 triggers the motor 98 to drive the rotatable output gear 100 in a first direction to rotate the rack gear 78 in a counterclockwise direction (as viewed from a front view as shown in FIGS. 7A-7D) from the first position, i.e., FIGS. 7A, 7B, to the second position, i.e., FIGS. 7C, 7D. The pin 70 is disposed rearwardly relative to the rack gear 78 and operatively coupled to the rack gear 78 via the spring 72. The interaction between the rack gear 78, the pin 70 and the spring 72 is described fully hereinbelow.

Figure 8A:
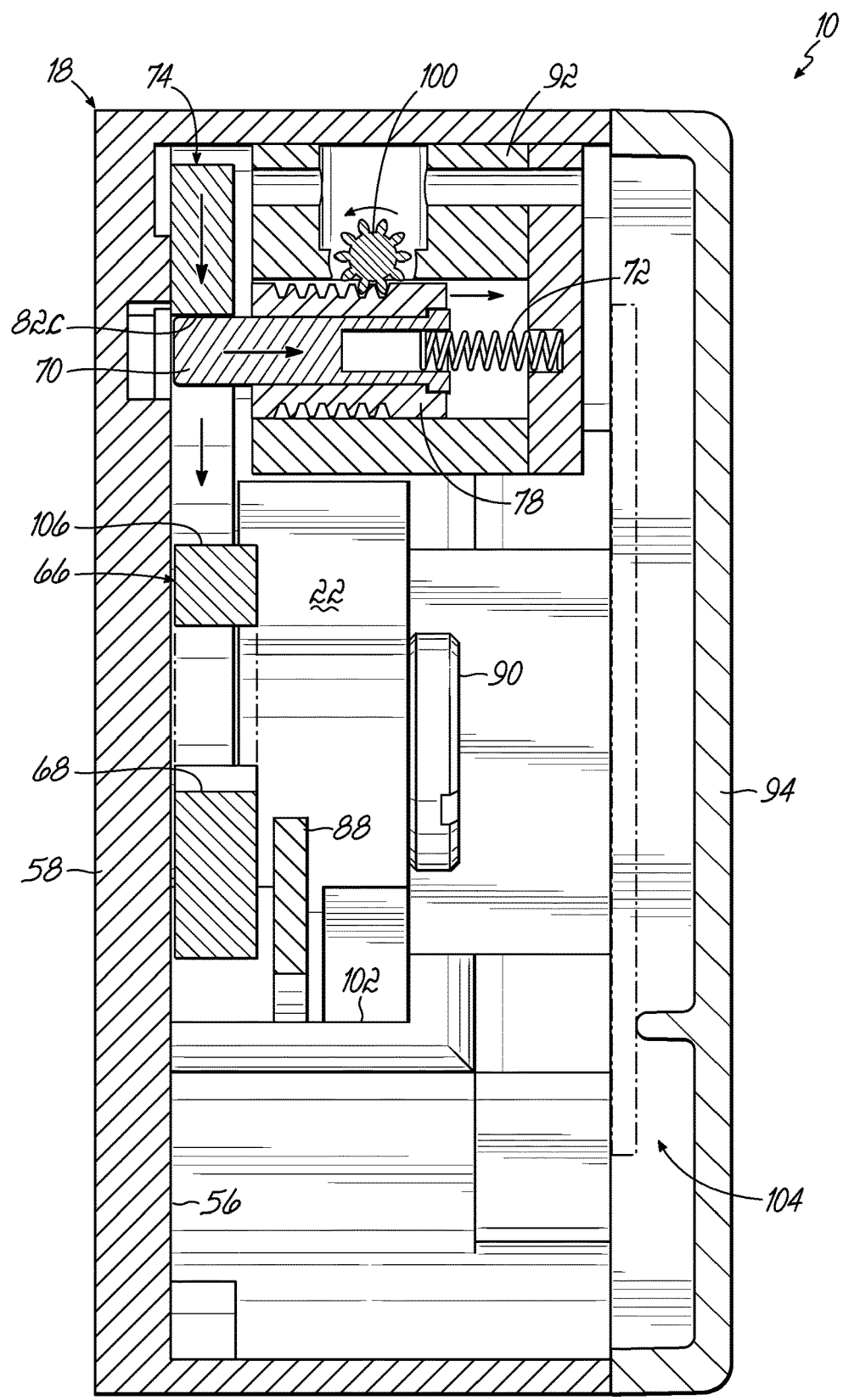
FIGS. 8A-8D are cross-sectional views taken along section line 8A-8A through 8D-8D of FIGS. 7A-7D showing a relock device of the device of FIG. 1.

As shown in FIGS. 7A and 8A, the lever arm 74 is in the disengaged position, unable to move downwardly to thereby engage with the cam notch 68 provided on rotary element 66 resulting in the bolt 22 being in the locked position. The pin 70 is positioned under the hook 82 of the lever arm 74 to guide the arm 74 due to the spring 72 expanding and pushing the pin 70 under the hook 82 of the lever arm 74. When the pin 70 is positioned under the hook 82 of the lever arm 74, the lever arm is unable to move further down and engage the cam notch 68 provided on the rotary element 66. The bolt 22 is then prevented from moving from the locked position as the lever arm 74 is prevented from engaging the cam notch 68 due to the pin 70 resting under the hook 82 of the lever arm 74.

Figure 8B:
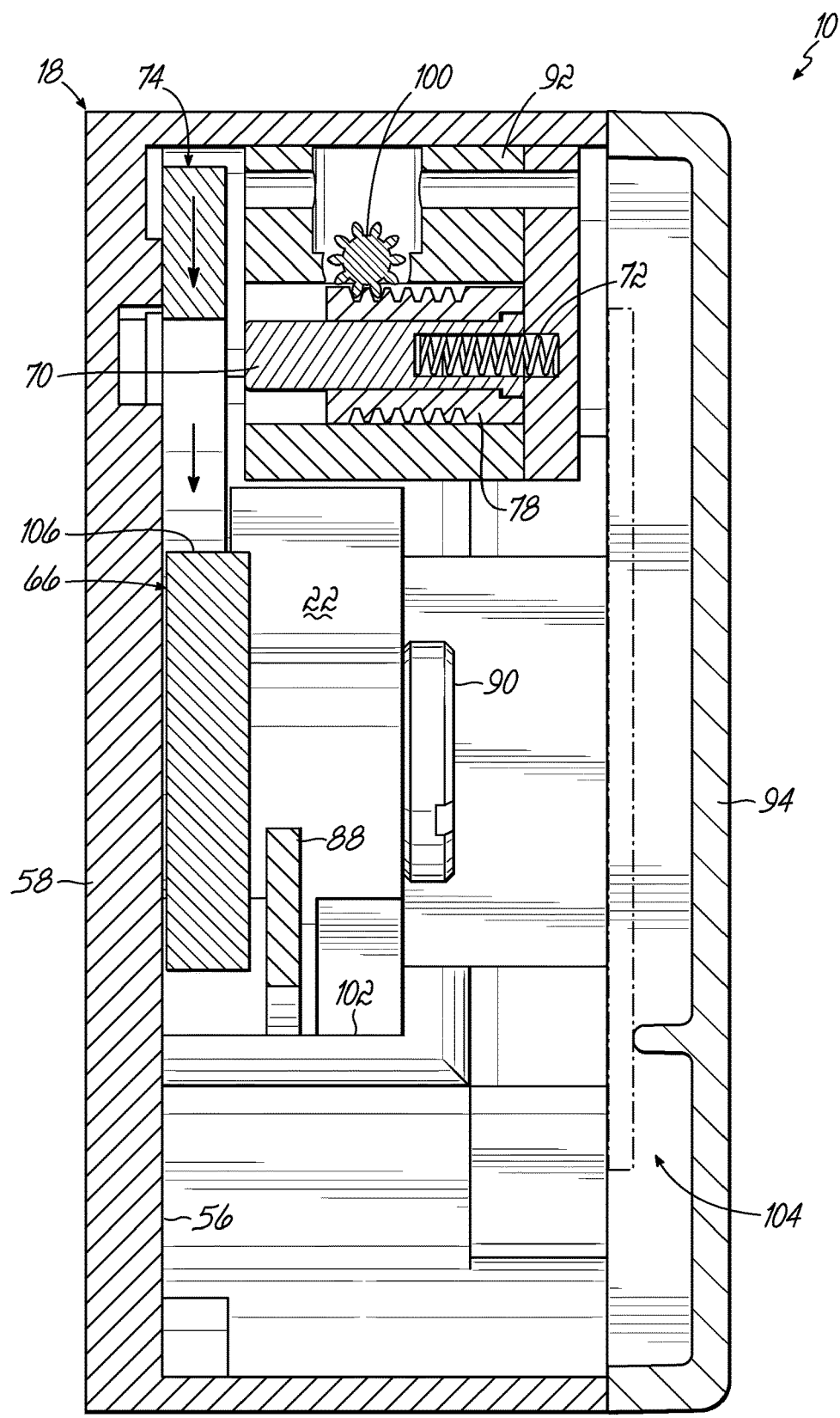
Figure 8C:
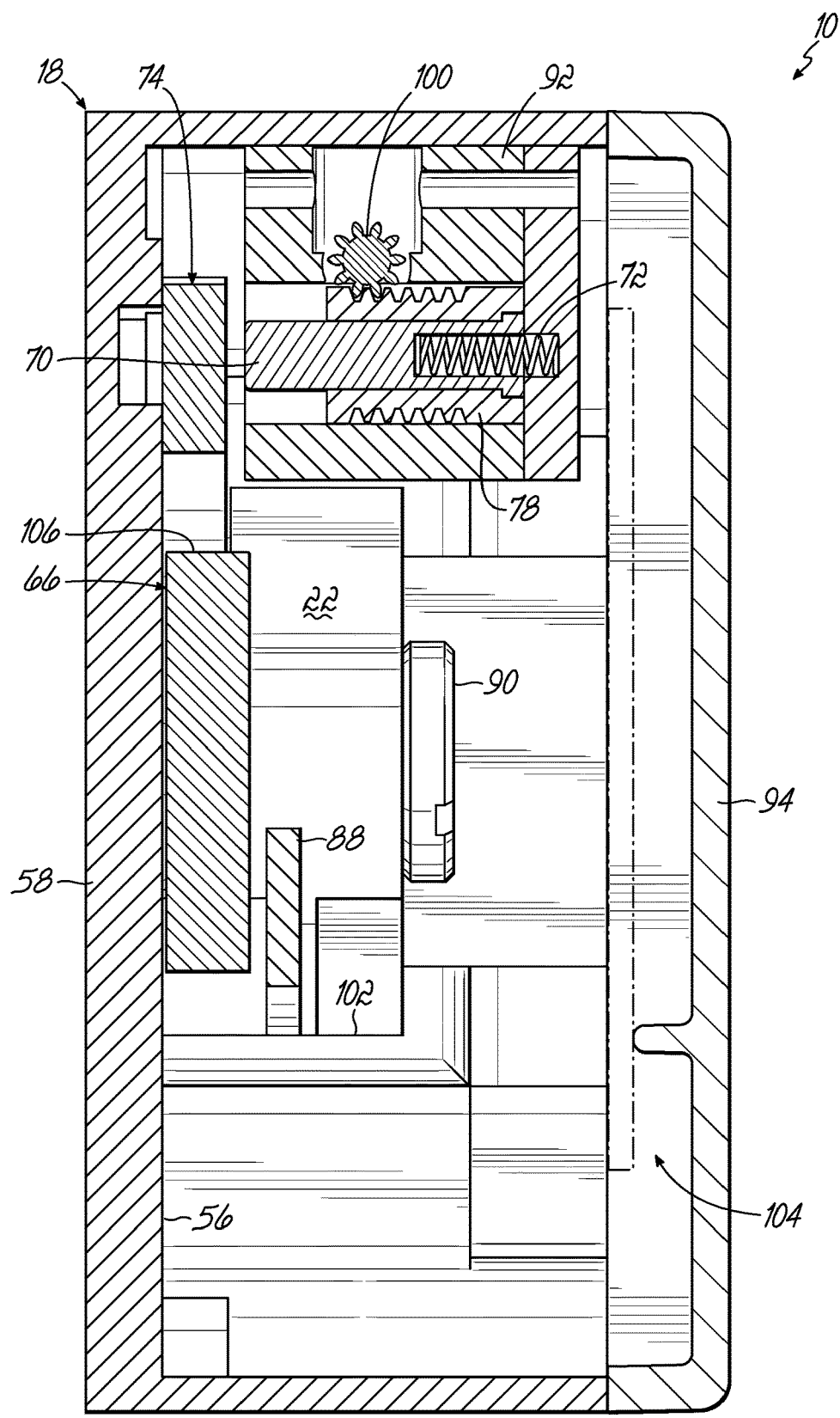
Figure 8D:
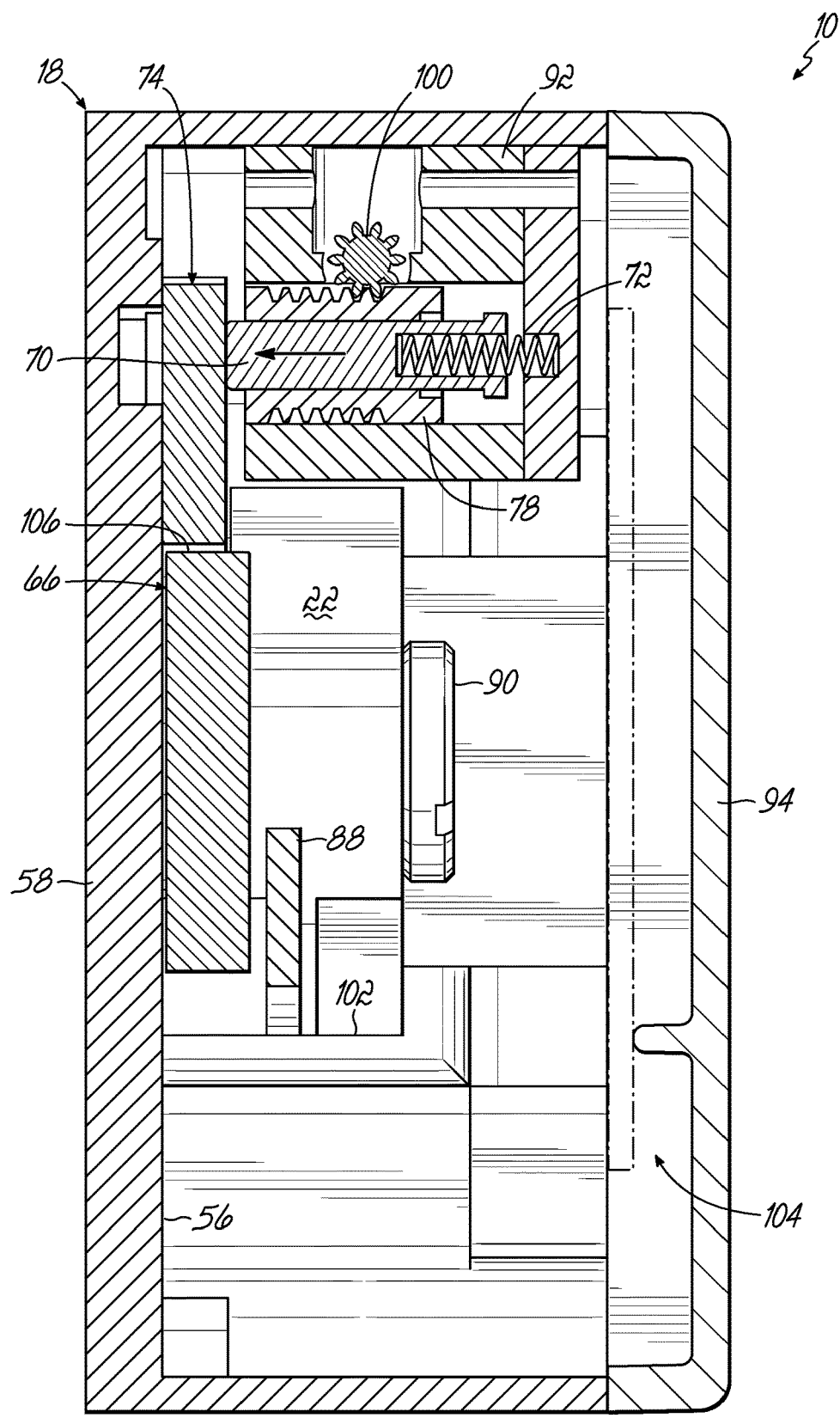

As shown in FIGS. 7B and 8B, the authorized individual has satisfied the requirements of the controller 40, such as correctly entering the predetermined combination code, and has instructed the motor drive circuitry 44 to drive the motor 98 to initiate the process of transferring the bolt 22 from the locked position to the unlocked position. The motor 98 drives the rotatable output gear 100 such that the rotatable output gear 100 rotates. The rotation of the rotatable output gear 100 that is coupled to the rack gear then in turn rotates the rack gear 78. As the rack gear 78 rotates, the spring 72 retracts and moves the pin 70 into a second position where the pin 70 is no longer positioned in the lever aperture 76 and is no longer in contact with the bottom of the hook 82. When the pin 70 is retracted from the lever aperture, the lever arm 74 has the freedom to move further down. The shaft 62 also begins to move as driven by the motor drive circuitry 44. The movement of the shaft 62 in the counterclockwise position as shown in the front view of the touchscreen lock configuration 10 in FIGS. 7B and 8B in turn moves the rotary element 66 in the counterclockwise position thereby moving the position of the position of the cam notch 68.

As the rotary element 66 is rotated in the counterclockwise position as viewed in the front view of the touchscreen lock configuration 10 in FIG. 7B, FIG. 8B, FIG. 7C, and FIG. 8C when the lever arm is in the disengaged position as shown in FIGS. 7A and 7B, the hook 82 of the lever arm 74 without the obstruction of the pin 70 interacts with the cam surface 106 of the rotary element 66. In turn, the rotary element 66 continues to rotate in the counterclockwise position enabling the cam notch 68 to continue to also move in the counterclockwise position such that the lever arm 74 interacts with the cammed surface 106 of the rotary element 66 in a cammed relationship until the shaft 62 turns the rotary element 66 to the point. As the hook 82 of the lever arm 74 interacts with the cam surface 106 in the cammed relationship until the shaft 62 turns the rotary element 66 to the point where the hook 82 of the lever arm 74 may engage the cam notch 68 of the rotary element 66 as shown in FIGS. 7C, 7D, and 9. As the hook 82 engages the cam notch 68, the rotary element 66 continues to rotate in the counterclockwise position. In doing so, the cam notch 68 also continues to move in the counterclockwise position but now with the hook 82 of the lever arm 74 engaged with the cam notch 68. As the rotary element 66 rotates in the counterclockwise position with the hook 82 of the lever arm 74 engages with the cam notch 68, the lever arm 74 moves the bolt 22 from the locked position to the unlocked position.

More specifically, force transmitting through the rotary element 66, the cam notch 68, the outside edge portions 82a, 82b, 82c of lever arm 74, and the hook 82 to a motor driven force being transmitted to forcibly draw lock bolt 22 into casing 58 in the direction of arrows 110 as shown in FIGS. 7C and 7D. Ultimately, the lock bolt 22 becomes substantially drawn into casing 58 to its unlocked position.

In turn as shown in FIGS. 7C, 8C, 7D, 8D and 9, rack gear 78 may drive the pin 70 back down into the original position when the bolt 22 was initially in the locked position. However, the pin 70 no longer engages the bottom surface of the arm 74 due to the position of the lever arm 74 with the hook 82 engaging the cam notch 68 preventing the spring 72 from expanding and pushing the pin 70 in to the bottom surface of the arm 74. The position of the lever arm 74 is blocking the pin 70 from moving such that the pin rests upon the surface of the lever arm 74 as the hook 82 of the lever arm 74 is engaged with the cam notch 68.

When the authorized individual desires to move the lock bolt 22 back to the locked position from the unlocked position, controller 40 may instruct the motor drive circuitry 44 to rotate the shaft 62 (see FIG. 1) to rotate the rotary element 66 in the counterclockwise direction as shown in the front view of the touchscreen lock configuration 10 as shown in FIGS. 7C, 8C, 7D, and 8D. The counterclockwise rotation as shown by the arrows positioned on the rotary element 66 causes the lever arm 74 to move and to eventually disengage from the cam notch 68 of the rotary element 66. This movement of the lever arm 74 moves the lock bolt 22 back to the locked position, wherein the lock bolt 22 is extending at least partially out of the casing 58. Depending on the rotational position of the rotary element 66 relative to the hook 74, after the motor drive circuitry 44 rotates the shaft 62 (see FIG. 1) in the counterclockwise direction to move the lock bolt 22 to the locked position, the lever arm 74 will essentially be configured as shown in FIG. 5A.

In turn, the pin 70 is previously resting upon the surface of the lever arm 74 as previously moved by the rack gear 78 when the hook 82 engaged the cam notch 68 of the rotary element 66 and the bolt is moved into the unlocked position. Upon the movement of the lever arm 74 when the hook 82 disengaged the cam notch 68 of the rotary element 66, the spring pin 70 may no longer be blocked by the surface of the lever arm 74. The spring 72 may then expand moving the pin 70 such that the pin is pushed back into the bottom of the hook 82 of the arm 74 positioned in the casing 58 thereby locking the bolt 22 into the locked position.

The Brief Summary and Abstract sections may set forth one or more but not all exemplary embodiments as contemplated by the inventors, and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The embodiments of the present invention may be summarized by several aspects, as set forth as follows, in addition to the aspects shown in the claims below.

Aspect 1: A self-powered lock, comprising: a housing; a lock bolt movable manually between a locked position and an unlocked position relative to the housing; a motor in the housing, the motor having a rotatable output gear; a rack gear engaging the rotatable output gear; a spring biased pin coupled with the rack gear; a manually operable electricity generator generating electricity upon manual actuation by the user, the electricity generator electrically connected to the motor to supply electricity thereto for operating the rotatable output gear; a lever arm moveable between disengaged and engageable positions and operatively coupled to the lock bolt to move the lock bolt between the locked and unlocked positions; and a rotary element engageable with the lever arm in the engageable position thereof, wherein rotation of the rotary element when the rotary element is engaged with the lever arm moves the lock bolt between the locked and unlocked positions, wherein the pin normally blocks the lever arm from moving from the disengaged position to the engageable position, and when the motor is actuated by electricity from the electricity generator, the rotatable output gear moves the rack gear and the pin to unblock the lever arm thereby allowing the lever arm to engage with the rotary element to allow a user to rotate the rotary element to move the lock bolt between the locked and unlocked positions, and the spring biased pin is biased back into a position blocking the lever arm when the rotary element moves the lock bolt to the locked position.

Aspect 2: A self-powered lock, comprising: a housing; a lock bolt movable manually between a locked position in which at least a portion of the lock bolt extends outward of the housing and an unlocked position in which the portion of the lock bolt is retracted within the housing; a motor in the housing, the motor having a rotatable output gear; a rack gear engaging the rotatable output gear; a pin mounted within the rack gear and having a portion extendible outward of the rack gear under a spring bias; a manually operable electricity generator generating electricity upon manual actuation by the user, the electricity generator electrically connected to the motor to supply electricity thereto for operating the rotatable output gear; a lever arm moveable between disengaged and engageable positions and operatively coupled to the lock bolt to move the lock bolt between the locked and unlocked positions; and a rotary element engageable with the lever arm in the engageable position thereof, wherein rotation of the rotary element when the rotary element is engaged with the lever arm moves the lock bolt between the locked and unlocked positions, wherein the pin normally blocks the lever arm from moving from the disengaged position to the engageable position, and when the motor is actuated by electricity from the electricity generator, the rotatable output gear moves the rack gear and the pin to unblock the lever arm thereby allowing the lever arm to engage with the rotary element to allow a user to rotate the rotary element to move the lock bolt between the locked and unlocked positions, and the spring biased pin is biased back into a position blocking the lever arm when the rotary element moves the lock bolt to the locked position.

Aspect 3: The self-powered lock of aspect 2, further comprising: a coil spring at least partially mounted within the pin and the rack gear to supply bias to the pin.

Aspect 4: A method of operating a self-powered lock, comprising: generating electricity using a manually operable electricity generator; storing the electricity; using the stored electricity to operate a motor having a rotatable output gear upon input of a correct combination code to the lock; rotating the rotatable output gear with the motor using the stored electricity to move a rack gear coupled with a pin and thereby unblock a lever arm; moving the lever arm to an engageable position relative to a rotary element; and rotating the rotary element after engagement with the lever arm to move a lock bolt between a locked position and an unlocked position relative to the housing.

Aspect 5: A method of operating a self-powered lock, comprising: generating electricity using a manually operable electricity generator; storing the electricity; using the stored electricity to operate a motor having a rotatable output gear upon input of a correct combination code to the lock; rotating the rotatable output gear with the motor using the stored electricity to move a rack gear coupled with a spring biased pin and thereby unblock a lever arm; moving the lever arm to an engageable position relative to a rotary element; rotating the rotary element after engagement with the lever arm to move a lock bolt between a locked position and an unlocked position relative to the housing; and moving the spring biased pin back into a position blocking the lever arm upon moving the lock bolt from the unlocked position to the locked position.

Aspect 6: A lock configuration, comprising: a power source configured to provide power for the lock configuration, wherein the power is consumed by the lock configuration when each of a plurality of features is executed by the lock configuration; an active touchscreen configured to provide an interface for a user to enable the user to interact with the lock configuration, wherein at least one feature to be executed by the lock configuration is requested by the user via the active touchscreen and feedback is provided to the user via the active touchscreen; and a controller configured to execute a plurality of actions in response to the at least one feature requested by the user via the active touchscreen, wherein each of the actions initiates the lock configuration to execute the at least one feature requested by the user and provides feedback to the user via the active touchscreen.

Aspect 7: The lock configuration of aspect 6, wherein the controller is further configured to adjust a position of each character included in a predetermined combination code as displayed by the active touchscreen each time the user attempts to enter the predetermined combination code via the active touchscreen.

Aspect 8: The lock configuration of aspect 7, wherein the controller is further configured to adjust a plurality of display characters that accompany each character included in the predetermined combination code as displayed by the active touchscreen so that at least one character included in the plurality of display characters differs from at least one character previously displayed by the active touchscreen each time the user attempts to enter the predetermined combination code via the active touchscreen.

Aspect 9: The lock configuration of aspect 8, wherein the active touchscreen is further configured to: prompt the user with each different screenshot displayed to the user by the active touchscreen in response to the user interacting with the active touchscreen, wherein each screenshot displays different information to assist the user in navigating execution of the lock configuration; and provide feedback to the user with each different screenshot displayed by the active touchscreen, wherein each different screenshot displayed is in response to an action executed by the user in interacting with the active touchscreen.

Aspect 10: The lock configuration of aspect 6, further comprising: a clock configured to provide time data associated with the user interacting with the active touchscreen, wherein the time data provides information associated with a date and time of the user interacting with the active touchscreen.

Aspect 11: The lock configuration of aspect 10, wherein the controller is further configured to: assess the time data provided by the clock when the user attempts to correctly enter the predetermined combination code when a time requirement is associated with access of the user to the lock configuration in an unlocked position, wherein the time requirement requires that the user correctly enter the predetermined combination code a specified date and time; prevent the lock configuration from transitioning into the unlocked position when the user correctly enters the predetermined combination code at a date and time that differs from the specified date and time associated with the time requirement; and enable the lock configuration to transition into the unlocked position when the user correctly enters the predetermined combination code at the specified date and time associated with the time requirement.

Aspect 12: The lock configuration of aspect 11, wherein the controller is further configured to: assess the time data provided by the clock when the user attempts to correctly enter the predetermined combination code and a time delay requirement is associated with access of the user to the lock configuration in the unlocked position, wherein the time delay requirement requires that the lock configuration remain in a locked position after the user correctly enters the predetermined combination code for a specified period of time; and prevent the lock configuration from transitioning into the unlocked position when the user correctly enters the predetermined combination code until the specified period of time associated with the time delay requirement is expired.

Aspect 13: A method for executing a plurality of features associated with a lock configuration, comprising: generating, by a power source, power for the lock configuration, wherein the generated power is consumed by the lock configuration when each of the features is executed by the lock configuration; providing an interface for a user, by an active touchscreen, to enable the user to interact with the lock configuration, wherein at least one feature to be executed by the lock configuration is requested by the user via the active touchscreen; providing feedback to the user via the active touchscreen; and executing a plurality of actions in response to the at least one feature requested by the user via the active touchscreen, wherein each of the actions initiates the lock configuration to execute the at least one feature requested by the user and provides feedback to the user via the active touchscreen.

Aspect 14: The method of aspect 13, wherein the executing the plurality of actions comprises: adjusting a position of each character included in a predetermined combination code as displayed by the active touchscreen each time the user attempts to enter the predetermined combination code via the active touchscreen.

Aspect 15: The method of aspect 14, wherein the executing the plurality of actions further comprises: adjusting a plurality of display characters that accompany each character included in the predetermined combination code as displayed by the active touchscreen so that at least one character included in the plurality of display characters differs from at least one character previously displayed by the active touchscreen each time the user attempts to enter the predetermined combination code via the active touchscreen.

Aspect 16: The method of aspect 15, wherein the providing the interface to the user comprises: prompting the user with each different screenshot displayed to the user by the active touchscreen in response to the user interacting with the active touchscreen, wherein each screenshot displays different information to assist the user in navigating execution of the lock configuration; and providing feedback to the user with each different screenshot displayed by the active touchscreen, wherein each different screenshot displayed is in response to an action executed by the user in interacting with the active touchscreen.

Aspect 17: The method of aspect 13, further comprising: providing time data, by a clock, that is associated with the user interacting with the active touchscreen, wherein the time data provides information associated with a date and time of the user interacting with the active touchscreen.

Aspect 18: The method of aspect 17, further comprising: assessing the time data provided by the clock when the user attempts to correctly enter the predetermined combination code when a time requirement is associated with access of the user to the lock configuration in an unlocked position, wherein the time requirement requires that the user correctly enter the predetermined combination code on a specified date and time; preventing the lock configuration from transitioning into the unlocked position when the user correctly enters the predetermined combination code at a date and time that differs from the specified date and time associated with the time requirement; and enabling the lock configuration to transition into the unlocked position when the user correctly enters the predetermined combination code at the specified date and time associated with the time requirement.

Aspect 19: The method of aspect 18, further comprising: assessing the time data provided by the clock when the user attempts to correctly enter the predetermined combination code and a time delay requirement is associated with access of the user to the lock configuration in the unlocked position, wherein the time delay requirement requires that the lock configuration remain in a locked position after the user correctly enters the predetermined combination code for a specified period of time; and preventing the lock configuration from transitioning into the unlocked position when the user correctly enters the predetermined combination code until the specified period of time associated with the time delay requirement is expired.

Aspect 20: A self-powered lock, comprising: a generator configuration configured to internally generate generator power for the self-powered lock, wherein the internally generated power is consumed by the self-powered lock when each of a plurality of features is executed by the self-powered lock; a display configured to provide an interface for a user to enable the user to engage an active touchscreen to interact with the self-powered lock, wherein the display consumes a decreased amount of power that is provided by the generator power internally generated by the generator configuration; and a controller configured to execute a plurality of actions in response to at least one feature requested by the user via the display, wherein each of the actions initiates the self-powered lock to execute the at least one feature requested by the user and provides feedback to the user via the display, and wherein the display is further configured to: consume the decreased amount of generator power when the user engages the display and requests that the display change an image that is displayed to the user; refrain from consuming the generator power when changing the image that is displayed to the user is not required by the user; and maintain the image that is displayed to the user without consuming the generator power.

Aspect 21: The self-powered lock of aspect 20, wherein the display further comprises an electrophoretic display.

Aspect 22: The self-powered lock of aspect 20, wherein the controller is further configured to: prevent the generator power from being supplied to the display when the user is not requiring that the display change the image that is displayed to the user; and access the generator power to have the generator power in the decreased amount provided to the display when the user requests that the display change the image that is displayed to the user.

Aspect 23: The self-powered lock of aspect 20, wherein the controller is further configured to: track access data associated with each time the user engages the self-powered lock, wherein the access data is data that is associated with an attempt to access a safe container that is associated with the self-powered lock.

Aspect 24: The self-powered lock of aspect 23, wherein the controller is further configured to: notify a remote computing device each time the user attempts to engage the display of the self-powered lock, wherein the remote computing device is positioned remote from the self-powered lock and is notified via wireless communication from the controller of the attempt by the user to engage the display.

Aspect 25: The self-powered lock of aspect 24, further comprising: a clock configured to provide time data associated with the user interacting with the display, wherein the time data provides information associated with a date and time of the user interacting with the display.

Aspect 26: The self-powered lock of aspect 25, wherein the controller is further configured to: provide the remote computing device with the time data associated with each time that the user attempts to engage the display of the self-powered lock, wherein the remote computing device is notified via wireless communication from the controller of time data associated with the attempt by the user to engage the display.

Aspect 27: The self-powered lock of aspect 26, wherein the controller is further configured to: provide the remote computing device with the access data associated with each time that the user attempts to engage the display of the self-powered lock, wherein the remote computing device is notified via wireless communication from the controller of access data associated with the attempt by the user to engage the display.

Aspect 28: The self-powered lock of aspect 24, further comprising: a camera configured to capture an image of the user that attempts to engage the display of the self-powered lock.

Aspect 29: The self-powered lock of aspect 28, wherein the controller is further configured to: provide the remote computing device with the image of the user captured by the camera each time that the user attempts to engage the display of the self-powered lock, wherein the remote computing device is notified via wireless communication from the controller of the image of the user captured by the camera.

Aspect 30: A method for providing a decreased power interface to a user for a self-powered lock, comprising: internally generating, by a generator configuration, generator power for the self-powered lock, wherein the internally generated power is consumed by the self-powered lock when each of a plurality of features is executed by the self-powered lock; providing an interface for a user, by a display, to enable the user to engage an active touchscreen to interact with the self-powered lock; consuming a decreased amount of power by the display that is provided by the generator power internally generated by the generator configuration; and executing a plurality of actions in response to at least one feature requested by the user via the display, wherein each of the actions initiates the self-powered lock to execute the at least one feature requested by the user and provides feedback to the user via the display; wherein the consuming the decreased amount of power by the display includes consuming the decreased amount of generator power when the user engages the display and requests that the display change an image that is displayed to the user; refraining from consuming the generator power when changing the image that is displayed to the user is not required by the user; and maintaining the image that is displayed to the user without consuming the generator power.

Aspect 31: The method of aspect 30, further comprising: preventing the generator power from being supplied to the display when the user is not requiring that the display change the image that is displayed to the user; and accessing the generator power to have the generator power in the decreased amount provided to the display when the user requests that the display change the image that is displayed to the user.

Aspect 32: The method of aspect 30, further comprising: tracking access data associated with each time the user engages the self-powered lock, wherein the access data is associated with an attempt to access a safe container that is associated with the self-powered lock.

Aspect 33: The method of aspect 32, further comprising: notifying a remote computing device each time the user attempts to engage the display of the self-powered lock, wherein the remote computing device is positioned remote from the self-powered lock and is notified via wireless communication from the controller of the attempt by the user to engage the display.

Aspect 34: The method of aspect 33, further comprising: providing time data, by a clock, that is associated with the user interacting with the display, wherein the time data provides information associated with a date and time of the user interacting with the display.

Aspect 35: The method of aspect 34, further comprising: providing the remote computing device with the time data associated with each time that the user attempts to engage the display of the self-powered lock, wherein the remote computing device is notified via wireless communication from the controller of time data associated with the attempt by the user to engage the display.

Aspect 36: The method of aspect 35, further comprising: providing the remote computing device with the access data associated with each time that the user attempts to engage the display of the self-powered lock, wherein the remote computing device is notified via wireless communication from the controller of access data associated with the attempt by the user to engage the display.

Aspect 37: The method of aspect 33, further comprising: capturing an image of the user, by a camera, that attempts to engage the display of the self-powered lock.

Aspect 38: The method of aspect 37, further comprising: providing the remote computing device with the image of the user captured by the camera each time that the user attempts to engage the display of the self-powered lock, wherein the remote computing device is notified via wireless communication from the controller of the image of the user captured by the camera.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A lock configuration, comprising:
   a generator configuration configured to internally generate generator power for the lock configuration, wherein the internally generated power is consumed by the lock configuration when each of a plurality of features is executed by the lock configuration;
   at least one additional power source configured to provide power to supplement the generator power for the lock configuration when the generator power is insufficient to execute at least one feature requested by a user to be executed by the lock configuration;
   a controller configured to execute a plurality of actions in response to the at least one feature requested by the user to be executed by the lock configuration, wherein each of the plurality of actions ensures sufficient power is available for the lock configuration to execute the at least one feature requested by the user.

2. The lock configuration of claim 1, further comprising:
   a plurality of solar cells configured to capture solar power and store the solar power in a power storage device, wherein the solar power is a supplement to the generator power generated by the generator configuration.

3. The lock configuration of claim 2, wherein the controller is further configured to:
   monitor a current power level associated with the generator power;
   assess a current power requirement of the lock configuration based on each of the features requested by the user to be executed by the lock configuration;
   determine whether the current power level associated with the generator power is sufficient to execute each of the features requested by the user to be executed by the lock configuration; and
   access the solar power stored in the power storage device to have the solar energy supplement the generator power generated by the generator configuration to execute each of the features requested by the user when the current power level of the generator power is insufficient to execute each of the features requested by the user.

4. The lock configuration of claim 1, further comprising:
   a battery source configured to store battery power and provide the battery power when requested by the controller for consumption by the lock configuration, wherein the battery power is a supplement to the generator power generated by the generator configuration.

5. The lock configuration of claim 4, wherein the controller is further configured to:
   monitor the current power level associated with the generator;
   assess a current power requirement of the lock configuration based on each of the features requested by the user to be executed by the lock configuration;
   determine whether the current power level associated with the generator power is sufficient to execute each of the features requested by the user to be executed by the lock configuration; and
   access the battery power stored in the battery source to have the battery power supplement the generator power generated by the generator configuration to execute each of the features requested by the user when the current power level of the generator power is insufficient to execute each of the features requested by the user.

6. The lock configuration of claim 5, wherein the controller is further configured to:
   monitor the current power level of the lock configuration as provided by the generator power, the solar power, and the battery power to determine whether the current power level has exceeded a threshold, wherein the threshold is a power level that is necessary for the lock configuration to execute the at least one feature requested by the user;
   maintain each of the features of the lock configuration in a deactivated state until the current power level of the lock configuration has exceeded the threshold; and
   activate each necessary feature of the lock configuration to satisfy the request of the user when the current power level of the lock configuration has exceeded the threshold.

7. The lock configuration of 6, wherein the controller is further configured to:
   monitor the current power requirement of the lock configuration based on each of the features requested by the user to be executed by the lock configuration;
   activate each required feature when required to satisfy a request by the user; and
   deactivate each unnecessary feature when each unnecessary feature is no longer required to satisfy the request by the user to conserve overall power consumed by the lock configuration.

8. A method for providing power to a lock configuration, comprising:
   internally generating, from a generator configuration, generator power for the lock configuration, wherein the internally generated power is consumed by the lock configuration when each of a plurality of features is executed by the lock configuration,
   providing power, from at least one additional power source, to supplement the generator power for the lock configuration when the generator power is insufficient to execute at least one feature requested by a user to be executed by the lock configuration; and
   executing a plurality of actions, by a controller, in response to the at least one feature requested by the user to be executed by the lock configuration, wherein each of the plurality of actions ensures sufficient power is available for the lock configuration to execute the at least one feature requested by the user.

9. The method of claim 8, wherein the providing power comprises:
   capturing solar power, by a plurality of solar cells; and
   storing the solar power in a power storage device, wherein the solar power is a supplement to the generator power generated by the generator configuration.

10. The method of claim 9, wherein the executing of the plurality of actions, comprises:

monitoring a current power level associated with the generator power;

assessing a current power requirement of the lock configuration based on each of the features requested by the user to be executed by the lock configuration;

determining whether the current power level associated with the generator power is sufficient to execute each of the features requested by the user to be executed by the lock configuration; and accessing the solar power stored in the power storage device to have the solar energy supplement the generator power generated by the generator configuration to execute each of the features requested by the user when the current power level of the generator power is insufficient to execute each of the features requested by the user.

11. The method of claim 8, wherein the providing power further comprises:

storing battery power; and providing the battery power when requested by the controller for consumption by the lock configuration, wherein the battery power is a supplement to the generator power generated by the generator configuration.

12. The method of claim 11, wherein the executing of the plurality of actions further comprises:

monitoring the current power level associated with the generator;

assessing a current power requirement of the lock configuration based on each of the features requested by the user to be executed by the lock configuration;

determining whether the current power level associated with the generator power is sufficient to execute each of the features requested by the user to be executed by the lock configuration; and accessing the battery power stored in the battery source to have the battery power supplement the generator power generated by the generator configuration to execute each of the features requested by the user when the current power level of the generator power is insufficient to execute each of the features requested by the user.

13. The method of claim 12, wherein the executing of the plurality of actions further comprises:

monitoring the current power level of the lock configuration as provided by the generator power, the solar power, and the battery power to determine whether the current power level has exceeded a threshold, wherein the threshold is a power level that is necessary for the lock configuration to execute the at least one feature requested by the user;

maintaining each of the features of the lock configuration in a deactivated state until the current power level of the lock configuration has exceeded the threshold; and activating each necessary feature of the lock configuration to satisfy the request of the user when the current power level of the lock configuration has exceeded the threshold.

14. The method of claim 13, wherein the executing of the plurality of actions further comprises:

monitoring the current power requirement of the lock configuration based on each of the features requested by the user to be executed by the lock configuration;

activating each required feature when required to satisfy a request by the user; and deactivating each unnecessary feature when each unnecessary feature is no longer required to satisfy the request by the user to conserve overall power consumed by the lock configuration.

* * * * *